(12) United States Patent
Ishizaki

(10) Patent No.: US 9,027,008 B2
(45) Date of Patent: May 5, 2015

(54) METHOD, COMPUTER, AND COMPUTER PROGRAM FOR SPECULATIVELY OPTIMIZING CODE

(71) Applicant: International Business Machines Corporation, Armonk, NY (US)

(72) Inventor: Kazuaki Ishizaki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 13/836,369

(22) Filed: Mar. 15, 2013

(65) Prior Publication Data
US 2013/0290942 A1   Oct. 31, 2013

(30) Foreign Application Priority Data

Apr. 25, 2012   (JP) ................................ 2012-099873

(51) Int. Cl.
G06F 9/45   (2006.01)
(52) U.S. Cl.
CPC .................................... *G06F 8/443* (2013.01)
(58) Field of Classification Search
None
See application file for complete search history.

(56) References Cited

U.S. PATENT DOCUMENTS

| | | | | |
|---|---|---|---|---|
| 5,475,851 A * | 12/1995 | Kodosky et al. | ............... | 715/763 |
| 5,784,553 A * | 7/1998 | Kolawa et al. | ............... | 714/38.1 |
| 2002/0063641 A1* | 5/2002 | Fish | ................ | 341/87 |
| 2003/0033594 A1* | 2/2003 | Bowen | ........................ | 717/141 |
| 2004/0225999 A1* | 11/2004 | Nuss | .............................. | 717/114 |
| 2006/0080642 A1* | 4/2006 | Ogawa et al. | ................... | 717/126 |
| 2006/0168491 A1* | 7/2006 | Lee et al. | ........................ | 714/733 |
| 2007/0055656 A1* | 3/2007 | Tunstall-Pedoe | .................. | 707/3 |
| 2009/0077543 A1* | 3/2009 | Siskind et al. | ................. | 717/136 |
| 2012/0198419 A1* | 8/2012 | Neill et al. | ...................... | 717/109 |

FOREIGN PATENT DOCUMENTS

| | | |
|---|---|---|
| JP | 2005215830 A | 8/2005 |
| JP | 2008102748 A | 5/2008 |

OTHER PUBLICATIONS

Holkner, A., et al. "Evaluating the Dynamic Behaviour of Python Applications", in Proceedings of Thirty-Second Australasian Computer Science Conference, vol. 91, Jan. 2009, pp. 1-10.
"Issue 109043: Optimize LOAD_GLOBAL—Code Review", Internet < http://codereview.appspot.com/109043/ >, Sep. 2009.

(Continued)

*Primary Examiner* — Chameli Das
(74) *Attorney, Agent, or Firm* — Fleit Gibbons Gutman Bongini & Bianco PL; Michael DeLuca

(57) ABSTRACT

A method, computer, and computer program for speculatively optimizing a code. The method includes speculatively optimizing the code characterized by searching in a predetermined order in at least one dictionary; extracting a value associated with a symbol name from a dictionary using the symbol name as a key; performing optimization to replace a symbol in the code with the value; compiling the code to be compiled including some or all of the optimized code; comparing, in response to detection of a change related to one dictionary among at least one dictionary, an order m in the predetermined order of the dictionary with the detected change to an order n of the dictionary with the extracted value; and invalidating the optimized code in the compiled code associated with the dictionary having the detected change in response to the results from the orders comparison and the type of change.

20 Claims, 12 Drawing Sheets

(56) References Cited

OTHER PUBLICATIONS

"9.2. Python Scopes and Namespaces", Python v.2.7. documentation, Internet < http://docs.python.org/tutorial/classes.html >, Jul. 6, 2010.

"Python hacking using dis/inspect module and ceval.c", Internet < http://www.nasuinfo.or.jp/FreeSpace/kenji/sf/python/virtualMachine/PyVM.htm#functionCall >, Sep. 2011.

"6.14 The exec statement", Python Reference Manual, Internet < http://docs.python.org/release/2.5.2/ref/exec.html >, Feb. 21, 2008.

"Dictionary Objects", Python v.2.6.5c2 documentation, Internet < http://www.python.org/doc//current/c-api/dict.html >, Mar. 5, 2010.

"Benchmarks—unladen-swallow", Internet <http://code.google.com/p/unladen-swallow/wiki/Benchmark >, Jan. 29, 2010.

NP-H "TOrnado", Internet < http://tornadoweb.org/ >, 2011.

* cited by examiner

• Rewriting Built-in Function Dictionary

• Built-in Function Dictionary

FIG. 8b

- Declaring Same Name (abs) Using Global Variable       827

```
01  C:\Doc\PATENT>c:\Python26\python.exe
02  Python 2.6.4 (r264:75708, Oct 26 2009, 08:23:19) [MSC v.1500 32 bit (Intel)] on win32
03  Type "help", "copyright", "credits" or "license" for more information.
04  >>> print abs(-1)
05  1
06  >>> global abs
07  >>> abs = 999
08  >>> print abs(-1)
09  Traceback (most recent call last):
10    File "<stdin>", line 1, in <module>
11  TypeError: 'int' object is not callable
12  >>> print abs
13  999
14  >>> del abs
15  >>> print abs(-1)
16  1
```

- Global Variable Dictionaries

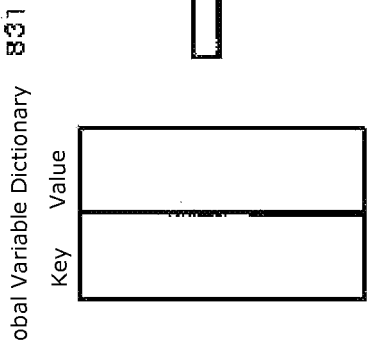

Global Variable Dictionary 831          Global Variable Dictionary 832

FIG. 9

```
901
01  g = 1
02  class test:
03    def foo(self):
04      global g
05      return g
06    def bar(self):
07      global h
08      h = -1
09
10  t = test()
11  for _ in xrange(100): t.foo();
12  t.bar();
13  t.foo();
```

```
902
01  g = 1
02  class test:
03    def foo(self):
04      global g
05      return g
06    def bar(self):
07      abs = lambda x : 0
08
09  t = test()
10  for _ in xrange(100): t.foo();
11  t.bar();
12  t.foo();
```

```
903
01  class test:
02    def bar(self):
03      gdic = {"g":1}
04      s = "def foo():\n global g\n return g\nfoo()\n"
05      exec s in gdic
06
07  t = test()
08  for _ in xrange(100): t.bar();
09  t.bar();
```

```
904
01  g = 1
02  class test:
03    def foo(self, x):
04      return abs(x)
05    def bar(self):
06      global g
07      g = -1
08
09  t = test()
10  for _ in xrange(100): t.foo(1);
11  t.bar();
12  t.foo(2);
```

```
905
01  class test:
02    def foo(self, x):
03      return abs(x)
04    def bar(self):
05      __builtins__.abs = lambda x : 0
06
07  t = test()
08  for _ in xrange(100): t.foo(1);
09  t.bar();
10  t.foo(2);
```

```
906
01  class test:
02    def bar(self, x):
03      gdic = {"g":x}
04      s = "def foo():\n return int(123)\nfoo()\n"
05      exec s in gdic
06
07  t = test()
08  for _ in xrange(100): t.bar(1);
09  t.bar(2);
```

METHOD, COMPUTER, AND COMPUTER PROGRAM FOR SPECULATIVELY OPTIMIZING CODE

CROSS-REFERENCE TO RELATED APPLICATION

This application claims priority under 35 U.S.C. §119 from Japanese Patent Application No. 2012099873 filed Apr. 25, 2012, the entire contents of which are incorporated herein by reference.

BACKGROUND OF THE INVENTION

The invention relates to a technique for optimizing code. More specifically, a method, computer, computer program, and computer program product for preventing under certain conditions the invalidation of compiled code that has been optimized.

Programming languages with local variables, global variables, local functions, and global functions are known to behave so that some global variables or functions are updated less frequently than other variables and functions including local variables as described in Alex Holkner et al., "Evaluating the dynamic behaviour of Python applications.", In Proceedings of the Thirty-Second Australasian Conference on Computer Science, Volume 91, pp. 19-28, 2009.

This behavior can be used to establish global variables or functions as constant values during compiling, speculatively optimize code including these constant values, execute compiled code including this optimized code, and invalidate compiled code when there is a possibility that these constant values will be changed during execution as described in "Issue 109043: Optimize LOAD_GLOBAL—Code Review".

The Python language can be run on most operating systems such as Linux®, Mac OS X®, and Windows®. Python has a proven track record at Google® and the National Aeronautics and Space Administration (NASA). As a result, Python is expected to become increasingly popular among users worldwide.

The search order in the lexical scope of the Python language is as follows: local variables, outside functions, global variables or functions, and then built-in variables or functions as described in "9.2. Python Scopes and Namespaces", Python v2.7.3.

A lexical scope is also called a static scope, and is a method using only a scope that can be determined syntactically. Searches in this order, that is, searches in the order of a global variable or function dictionary followed by a built-in variable or function dictionary, are performed by a single byte code instruction (LOAD_GLOBAL) as described in "Python hacking using dis/inspect module and ceval.c".

Therefore, when this invalidation technique is applied to the LOAD_GLOBAL instruction, speculative optimization can be performed to two cases of optimization: (1) rendering the values of global variables or functions constant (known as "constant propagation"), and (2) static determination of the callees for built-in variables or functions and code specialization (known as "code specialization"). On the other hand, compiled code is invalidated when a dictionary of global variables or functions or a dictionary of built-in variables or functions related to compiled code is updated as described in "Issue 109043: Optimize LOAD_GLOBAL-Code Review" reference.

In Python, an exec statement supports the dynamic execution of Python code. Any statement can be executed by an exec statement with given dictionaries of global variables or functions as described in "6.14 The exec statement", Python Reference Manual.

Therefore, because there is a possibility that a constant value will be updated when an address update is performed for given dictionaries of global variables or functions, compiled code that has been optimized is invalidated.

Patent Publication No. 2005-215830 discloses an optimization compiler which includes an update instruction detecting unit for detecting, in a program to be optimized, an update instruction for updating the content of a variable or the content of a storage area specified by a variable; an instruction sequence detecting unit for detecting, in a program to be optimized, an instruction sequence transferring control in response to a control transferring instruction for transferring control to another instruction sequence, and performing processing depending on the content of the variable or the content of the storage area; an instruction sequence compiler for optimizing and compiling the detected instruction sequence in processing for situations in which the content of the variable or the content of the storage area is specific predetermined content; and a setting instruction generating unit executed on a program to be optimized between the updating instruction and the control transferring instruction in situations in which the content of the variable or the content of the storage area is specific predetermined content, and generating a setting instruction for setting the destination address in the control transferring instruction for the address of the instruction sequence optimized by the instruction sequence compiling unit. In other words, in Patent Publication No. 2005-215830, the presence of any updates in a plurality of storage areas such as variables and array is detected, and an operation such as compiling is performed again.

Patent Publication No. 2008-102748 describes a program executing method, language processing system, and run-time routine able to avoid optimization suppression caused by a function which overwrites a variable value via the variable name, thereby speeding up execution of a program. In a computer system with a storage unit and a processing unit, the program executing method executes a program to be executed stored in the storage unit using a program for a language processing system stored in the storage unit.

In this language processing method, the program to be executed is optimized using a dynamic compiler for the language processing system on the assumption that the value of a variable stored in a predetermined area of the storage unit is immutable. The run-time routine of the language processing system is used to monitor whether or not the predetermined area in the program to be executed has been overwritten via the variable name corresponding to the predetermined area. When there is a possibility that an overwrite has occurred, the code optimized by the dynamic compiler on the assumption that the value of the variable stored in the predetermined area of the storage unit was immutable is invalidated. In other words, in Patent Publication No. 2008-102748, a decision whether or not to invalidate optimized code is made based on which value belonging to a set of variables has been overwritten.

When all dictionaries of global variables and functions and all dictionaries of built-in variables and functions are monitored, that is, when all dictionaries and all keys and values in these dictionaries are monitored, and a key or value is changed, an opportunity to perform speculative optimization is not lost if the compiled code associated with the changed dictionary is invalidated. However, monitoring and invalidating changes in all dictionaries is too costly and impractical.

In Issue 109043: Optimize LOAD_GLOBAL-Code Review" reference, whenever a dictionary of global variables or functions or a dictionary of built-in variables or functions is updated in some implementations of the Python language, compiled code is invalidated no matter which key or value was changed. However, this does not take into account the fact that invalidation of compiled code is not required when a dictionary is updated under certain conditions. As a result, the invalidation methods described above lose opportunities to improve performance.

Also, whenever the address for a dictionary of global variables or functions passed to the code is updated in some implementations of the Python language, the compiled code is always invalidated as described in "Issue 109043: Optimize LOAD_GLOBAL-Code Review" reference. However, this does not take into account the fact that invalidation of compiled code is not required when an address is updated under certain conditions. As a result, the invalidation methods described above lose opportunities to improve performance.

Therefore, the purpose of the present invention is to prevent invalidation when the invalidation of compiled code is not required, thereby improving performance.

SUMMARY OF THE INVENTION

Accordingly, one aspect of the present invention provides a method for speculatively optimizing code, the method including the steps of: searching in a predetermined order at least one dictionary holding at least one set of keys and values associated with the keys; extracting a value associated with a symbol name from at least one dictionary using the symbol name as a key; performing optimization to replace a symbol in the code with the extracted value, and compiling code to be compiled including some or all of the optimized code; comparing, in response to detection of a change related to one dictionary among a set containing at least one dictionary, an order m in the predetermined order of the dictionary having the detected change to an order n in the predetermined order of a dictionary having the extracted value, wherein m is an integer equal to or greater than 1 and n is an integer equal to or greater than 1; invalidating the code optimized in the optimization using extracted value replacement in the compiled code associated with the dictionary having the detected change in response to the results from orders comparison and the type of change; and wherein at least one of the steps is carried out using a computer device.

Another aspect of the present invention provides a computer for speculatively optimizing code, the computer including: a value extracting unit searching in a predetermined order at least one dictionary holding one or more sets of keys and values associated with the keys, and extracting a value associated with a symbol name from the one or more dictionaries using the symbol name as a key; a compiling unit performing optimization to replace a symbol in the code with the extracted value, and compiling code to be compiled including some or all of the optimized code; a comparing unit comparing, in response to detection of a change related to one dictionary among the one or more dictionaries, an order m, where m is an integer equal to or greater than 1, in the predetermined order of the dictionary with the detected change to an order n, where n is an integer equal to or greater than 1, in the predetermined order of a dictionary having the extracted value; and an invalidating unit invalidating the code optimized in the optimization using extracted value replacement in the compiled code associated with the dictionary having the detected change in response to the results from the orders comparison and the type of change.

Another aspect of the present invention includes a computer readable storage medium tangibly embodying a computer readable program code having computer readable instructions which, when implemented, carries out the above steps.

BRIEF DESCRIPTION OF THE DRAWINGS

FIG. 8b shows how a user rewrites to declare the same name using a global variable as in the built-in function in the Python language which can be used in an embodiment of the present invention.

FIG. 9 shows an example of code in the Python language which can be used in an embodiment of the present invention.

DETAILED DESCRIPTION OF THE PREFERRED EMBODIMENTS

Figure 1:
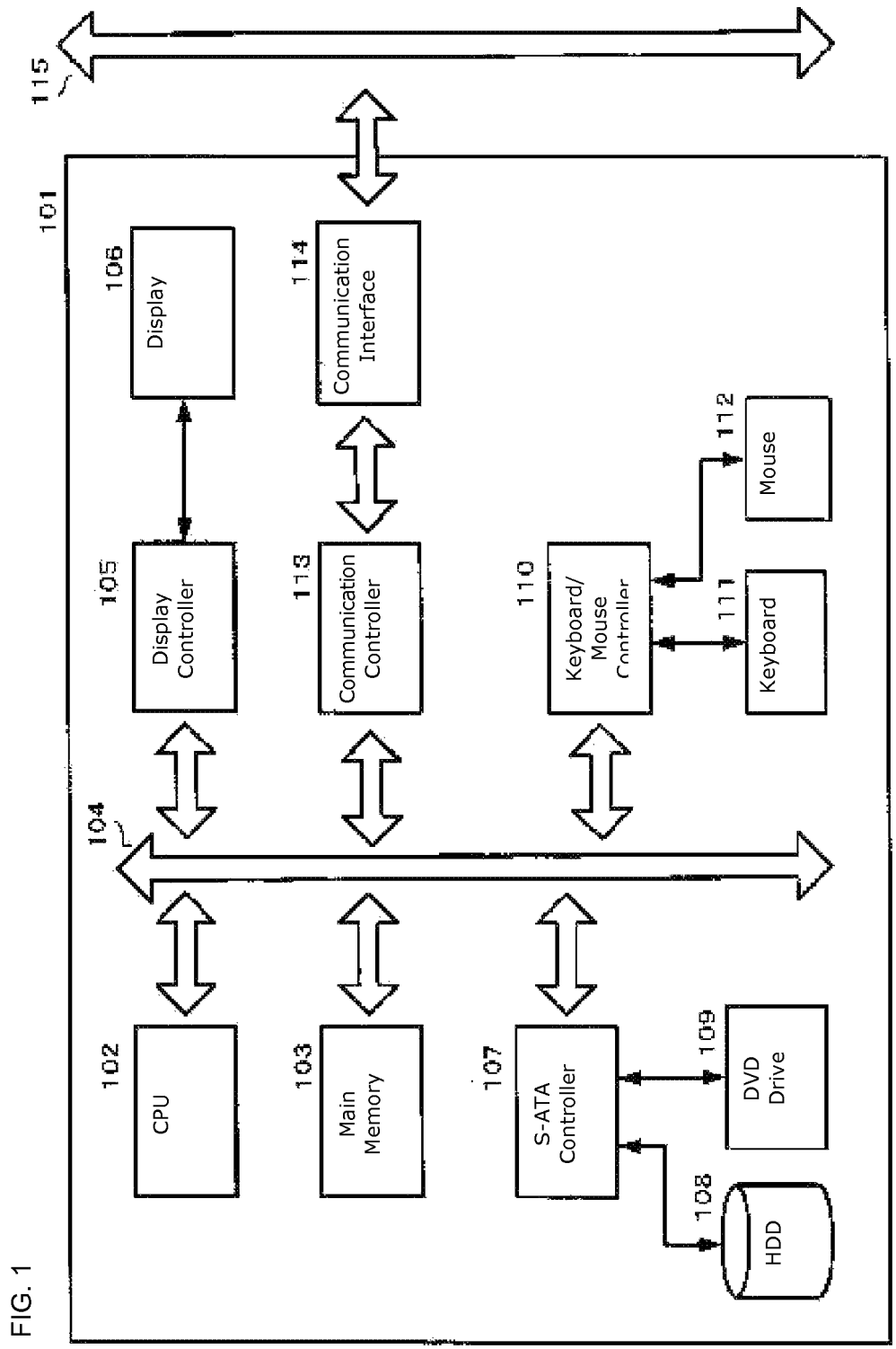
FIG. 1 is a diagram showing an example of a hardware configuration for an information processing terminal used to realize a device according to an embodiment of the present invention.

The present invention is a method for speculatively optimizing code. In order to solve the problem described above, the method includes: searching in a predetermined order one or more dictionaries, and extracting a value associated with a symbol name from the dictionaries using the symbol name as a key; performing optimization to replace a symbol in the code with the extracted value, and compiling code to be compiled including some or all of the optimized code; comparing, after the compiling and in response to detection of a change related to one dictionary among the dictionaries, the order m (where m is an integer equal to or greater than 1) of the dictionary having the detected change to the order n (where n is an integer equal to or greater than 1) of the dictionary having the extracted value; and invalidating the code optimized in the optimization using extracted value replacement in the compiled code associated with the dictionary having the detected change in response to the results from the orders comparison and the type of change.

The present invention is a method for speculatively optimizing code, in which the method includes the steps of:

searching in a predetermined order one or more dictionaries holding one or more sets of keys and values associated with the keys, and extracting a value associated with a symbol name from the one or more dictionaries using the symbol name as a key;

performing optimization to replace a symbol in the code with the extracted value, and compiling code to be compiled including some or all of the optimized code;

comparing, in response to detection of a change related to one dictionary among the one or more dictionaries, an order m (where m is an integer equal to or greater than 1) in the predetermined order of the dictionary having the detected change to an order n (where n is an integer equal to or greater than 1) in the predetermined order in a dictionary having the extracted value; and invalidating the code optimized in the optimization using extracted value replacement in the compiled code associated with the dictionary having the detected change in response to the results from the orders comparison and the type of change. The code compiled in the compiling step is sometimes referred to below as "compiled code according to the present invention", and code compiled in a step other than the compiling step is sometimes referred to below as "other compiled code".

In an aspect of the present invention, the change related to the dictionary can be addition of a key, deletion of a key, an update using the same value or a different value, or a change in dictionary address.

In an aspect of the present invention, invalidation is performed under the following conditions:

the order m is less than the order n, the change related to the dictionary is addition of a key, deletion of a key, or a dictionary address change, and one of the keys in a dictionary after an address change does not match any key in the dictionary before the address change; or the order m is equal to the order n, the change related to the dictionary is deletion of a key, an update using a different value, or a dictionary address change, and one of pair of key and value in a dictionary after an address change does not match any pair of key and the value in the dictionary before the address change.

However, invalidation is prohibited when the order m is greater than the order n, regardless of the type of change related to the dictionary.

In an aspect of the present invention, invalidation is not performed under the following conditions. In other words, the method continues to execute compiled code associated with a dictionary with a detected change under the following conditions:

the order m is less than the order n, the change related to the dictionary is an update using the same value or a different value, or a dictionary address change, and all of the keys in a dictionary after an address change matches any key in the dictionary before the address change;

the order m is equal to the order n, the change related to the dictionary is addition of a key, an update using the same key, or a dictionary address change, and all of the pairs of the key and value in a dictionary after an address change matches any pair of key and the value in the dictionary before the address change; or the order m is greater than the order n regardless of the type of change related to the dictionary.

In an aspect of the present invention, the computer can also include a step for recording the order n in the predetermined order of the dictionary with the extracted value.

In an aspect of the present invention, the step for recording the order n also includes a step for storing, as data associated with the compiled code, the order n, sets of keys and values of dictionaries with up to the order n, and the addresses of dictionaries with up to n the order.

In an aspect of the present invention, the method also includes the step of associating the compiled code with the dictionary having the extracted value used in the optimization of the compiled code during compiling.

In an aspect of the present invention, the method also includes a step for initiating the monitoring of dictionaries referenced during the search among the one or more dictionaries, that is, changes related to up to the n-th dictionary, or changes related to all of the one or more dictionaries.

In an aspect of the present invention, the method can execute the comparing step and the invalidating step during execution of the compiled code after the compiling step or during execution of uncompiled code in the compiling step.

In an aspect of the present embodiment, the method can include a step for repeating the comparing step and the invalidating step each time a change related to one of the dictionaries among the one or more dictionaries has been detected after the invalidating step.

In an aspect of the present invention, optimization to replace the symbol in the code with the extracted value is performed on a symbol in the code determined by a value referenced in the one or more dictionaries.

In an aspect of the present invention, the comparing step can also include the steps of: identifying compiled code associated with the dictionary with the detected change; and extracting the order n from the data associated with the compiled code.

In an aspect of the present invention, the invalidating step can also include a step for extracting a key, value, dictionary address or a combination thereof from the data associated with the identified compiled code.

In an aspect of the present invention, the plurality of dictionaries can include a global variable or function dictionary, or a built-in variable or function dictionary. In an aspect of the present invention, the $1^{st}$ order can be a global variable or function dictionary and the $2^{nd}$ order can be a built-in variable or function dictionary in the predetermined order, where the $1^{st}$ order is given priority over the $2^{nd}$ order in the predetermined order.

In an aspect of the present invention, the code can be code written in the Python language.

The present invention also provides a computer for speculatively optimizing code, in which the computer includes:

a value extracting unit searching in a predetermined order one or more dictionaries holding one or more sets of keys and values associated with the keys, and extracting a value associated with a symbol name from the one or more dictionaries using the symbol name as a key;

a compiling unit performing optimization to replace a symbol in the code with the extracted value, and compiling code to be compiled including some or all of the optimized code;

a comparing unit comparing, in response to detection of a change related to one dictionary among the one or more dictionaries, the order m (where m is an integer equal to or greater than 1) in the predetermined order in the dictionary with the detected change to the order n (where n is an integer equal to or greater than 1) in the predetermined order in a dictionary having the extracted value; and an invalidating unit invalidating the code optimized in the optimization using extracted value replacement in the compiled code associated with the dictionary having the detected change in response to the results from the orders comparison and the type of change.

Also, the present invention provides a computer for speculatively optimizing code, and this computer includes a processor, memory connected to the processor, and a storage device for storing code and a computer program for executing each step of a method described above. The processor loads the computer program into the memory, executes the computer program, and speculatively optimizes the code.

Also, the present invention provides a computer program for speculatively optimizing code. This computer program is executed by a computer to perform each step of a method described above.

A computer program for executing the functions of the present invention can be stored on any computer-readable storage medium, including a floppy disk, MO, CD-ROM, DVD, BD, hard disk, USB memory, ROM, MRAM or RAM. The computer program can also be downloaded from another data processing system connected to a communication network for storage on a recording medium, or can be copied from another recording medium. The program can also be compressed, divided into a plurality of programs, and recorded on one or more recording media. A computer program product embodying the present invention can take a variety of forms. Computer program products include recording media for storing the computer program, or transmission media for transmitting the computer program.

This summary of the present invention is not intended to enumerate all of the required characteristics of the present invention. The present invention can be realized by any combination or sub-combination of these configurational elements.

A person of skill in the art can easily devise several variations such as combining the hardware elements used in the embodiment of the present invention with multiple machines to distribute and implement the functions. These variations are encompassed within the concept of the present invention. However, these configurational elements are for illustrative purposes only, and all of the configurational elements are not essential configurational elements of the present invention.

Also, the present invention can be realized by hardware, software, or a combination of hardware and software. When the present invention is executed by a combination of hardware and software, it is typically executed by a device in which the computer program has been installed. Here, the computer program is downloaded to the memory of the device and executed. The computer program then controls the device and executes the processing of the present invention. This computer program can be configured from groups of instructions expressed in any language, code or notation. The device can execute the specific functions in the group of instructions immediately, or after (1) converting the group of instructions into another language, code or notation, and/or (2) copying the group of instructions to another medium.

In an embodiment of the present invention, unlike the prior art in which compiled code is invalidated to an excessive degree, conditions can be established to invalidate compiled code with greater accuracy. As a result, there are fewer opportunities in which optimized compiled code is invalidated. The present invention also has greater effect by handling rarely or infrequently updated variables or functions as constants in value replacement.

One embodiment of the present invention will now be explained in detail with reference to the drawings. However, the present invention as described in the scope of the claims is not limited to the following embodiment, and all combinations of features explained in the embodiment are not necessarily essential to the technical solution of the present invention. Also, the present invention can be embodied in different ways, and it should be clear to any person skilled in the art that various modifications and improvements can be added to the embodiment below. The same elements are denoted by the same numbers throughout the entire explanation of the embodiment unless otherwise noted.

FIG. 1 is a diagram showing an example of a hardware configuration for an information processing terminal used to realize a device according to an embodiment of the present invention.

This computer (101) includes a CPU (102) and a main memory (103), and these are connected to a bus (104). The CPU (102) is preferably based on a 32-bit or 64-bit architecture. Examples that can be used include the Core i® series, Core 2® series, Atom® series, Xeon® series, Pentium® series or Celeron® series from Intel, and the Opteron® series, Phenom® series, Athlon® series, Turion® series, Sempron® or A-series from AMD. A display (106) such as a liquid crystal display (LCD) is connected to the bus (104) via a display controller (105). In order to control the computer, the display (106) can be used to display, via a graphic interface, information from a computer connected to a network via a communication line, and information on software operating on the computer. A disk (108), such as a silicon disk or hard disk, can be connected to the bus (104) via a SATA or IDE controller (107). A drive (109), such as a CD, DVD or BD drive, can also be connected to the bus (104) via a SATA or IDE controller (107). A keyboard (111) and mouse (112) can be connected to the bus (104) via a keyboard/mouse controller (110) or USB bus which is not shown. However, the present invention does not have to be embodied in this way.

Programs, such as the operating system, Python processing environment, Python applications, programs providing a compiler during execution in Python, a JAVA® processing environment such as J2EE, JAVA® applications, JAVA® virtual machines (VM), and JAVA® just-in-time (JIT) compilers, as well as other programs and data, are stored on the disk (108) for download to the main memory. Software allowing for the input and editing of text, and character conversion software such as a front end processor (FEP) can also be stored in the disk (108) for download to the main memory. The operation system can be LINUX® provided by a LINUX® distributor, the WINDOWS® operating system from Microsoft Corporation, MacOS® or iOS® from Apple Computer Incorporated, or a UNIX®-based system incorporating an X Window System, such as AIX® from IBM®.

If necessary, the drive (109) can be used to install a program on the disk (108) from a CD-ROM, DVD-ROM or BD. The communication interface (114) can use, for example, an Ethernet (registered trademark) protocol. The communication interface (114) is connected to a bus (104) via a communication controller (113), and functions to physically connect the computer (101) to the communication network (115). This provides a network interface layer for the TCP/IP communication protocol in the communication function of the operating system of the computer (101). The communication line can be based on a wired LAN environment, or based on a wireless LAN environment, for example, a Wi-Fi standard such as IEEE802.11a/b/g/n. It should also be clear from the above that a computer used in an embodiment of the present invention is not restricted to a particular operating system environment.

Figure 2:
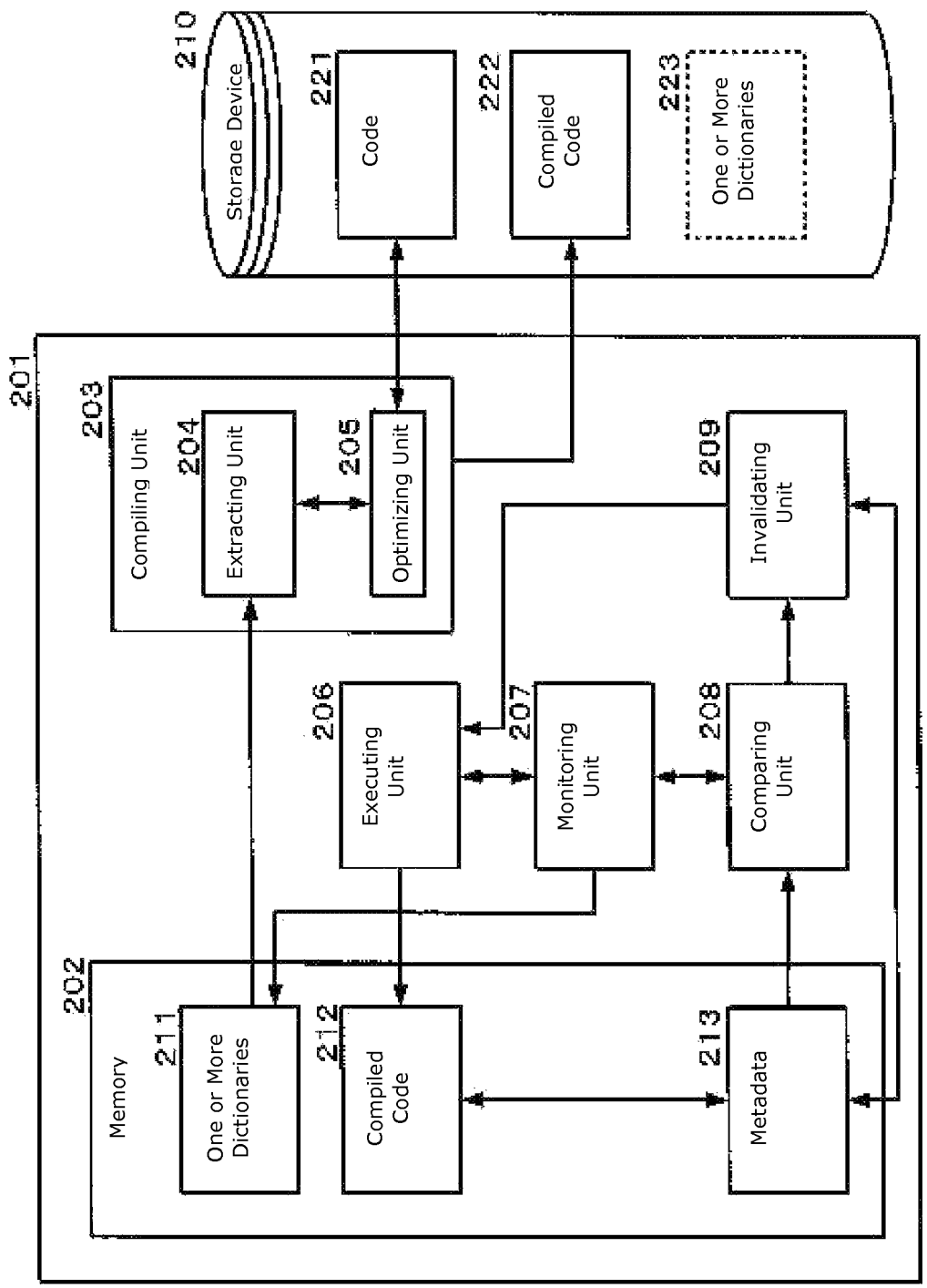
FIG. 2 is a function block diagram of a computer according to an embodiment of the present invention incorporating the hardware configuration in FIG. 1.

FIG. 2 is a function block diagram of a computer according to an embodiment of the present invention preferably incorporating the hardware configuration in FIG. 1. The computer (201) can have a hardware configuration according to FIG. 1. The computer (201) can include memory (202), a compiling unit (203), an extracting unit (204), an optimizing unit (205), an executing unit (206), a monitoring unit (207), a comparing unit (208), and an invalidating unit (209). The compiling unit (203) can incorporate the extracting unit (204) and the optimizing unit (205). The memory (202) can correspond to the main memory (103) in FIG. 1. The storage device (210) can correspond to the disk (108) in FIG. 1. The computer (201) can have a built-in storage device (210), or the computer (201) can be wired or connected wirelessly to an external storage device (210).

The memory (202) can store one or more dictionaries (211), compiled code (212), and metadata (213). In the following explanation, "dictionary (211)" includes cases in which there is only one dictionary and cases in which there is a plurality of dictionaries. A dictionary (211) has one or more sets of keys and values associated with keys. A dictionary (211) is described in detail below with reference to FIG. 3.

A dictionary (211) is loaded into the memory (202) from the storage device (210) when compiled code compiled during the compiling of code or during the compiling in Step 603 in FIG. 6 referred to below as "compiled code according to the present invention" below or compiled code compiled during compiling outside of Step 603 referred to below as "other compiled code", is executed, or when uncompiled code is executed by the interpreter.

The compiled code (212) is some or all of the compiled code (222) stored in the storage device (210), and is loaded into the memory (202) from the storage device (210) during execution of compiled code. The compiled code (212) includes compiled code according to the present invention and other compiled code. Also, the compiled code (212) can be code compiled by the compiling unit (203) described below.

The metadata (213) is created in accordance with the present invention, and can be the order n in the predetermined order of dictionaries having a detected change related to a dictionary among the dictionaries (211), the key and data sets of the dictionaries up to the order n, and the addresses of the dictionaries up to the order n.

The metadata (213) is data associated with compiled code (212), and can be data that can be referenced when compiled code according to the present invention or other compiled code is executed, or when uncompiled code is executed by the interpreter. The predetermined order can be the search order assigned to the dictionaries, or a search order according to the type of dictionary determined by the language system. For example, the search order can be represented by the order 1, 2, 3, . . . k where k is an integer when the $1^{st}$ order is given priority over the $2^{nd}$ order. However, the present invention is not limited to this example. For example, in the Python language, the search order is global variable or function dictionaries, followed by built-in variable or function dictionaries.

As a result, in the Python language, the extracting unit (204) can reference global variable or function dictionaries followed by built-in variable or function dictionaries. In the case of a global variable or global function dictionary, there are global-related dictionaries, and among these there are keys and values related to global variables and global symbols. Similarly, in the case of a built-in variable or built-in function dictionary, there are built-in-related dictionaries, and among these there are keys and values related to built-in variables and built-in symbols.

The extracting unit (204) searches dictionaries (211) in the predetermined order, and extracts values associated with symbol names from dictionaries (211) using symbol names as keys. When there is only one dictionary (211), the extracting unit (204) can reference the dictionary and extract the value. When there is more than one dictionary (211), the extracting unit (204) references the dictionaries in the predetermined order.

Also, the extracting unit (204) or the compiling unit (203) can record in the metadata (213) the order n where n is an integer equal to or greater than 1, in the predetermined order of the dictionaries from which values were extracted.

The optimizing unit (205), as the optimization process, replaces symbols in the code, for example, global variables, using values extracted by the extracting unit (204). In other words, the optimizing unit (205) performs optimization by replacement. By replacing symbols in code with extracted values, the values are treated as constants.

The compiling unit (203) functions as a compiler. The compiling unit (203) compiles code to be compiled including some or all of the code optimized by the optimizing unit (205). Also, the compiling unit (203) can compile code to be compiled including some or all code not optimized by the optimizing unit (205). The compiling unit (203) can store the code that has been compiled (the compiled code) (222) in the storage device (210). Alternatively, the compiling unit (203) can store compiled code directly in the memory (202) (see 212) when compiled code according to the present invention and other compiled code is being executed during the compiling process.

Also, the compiling unit (203) can record, for example, in the metadata (213), the order n where n is an integer equal to or greater than 1, in the predetermined order of dictionaries in which values have been extracted, the key and value sets of up to the n-th dictionary, and the addresses up to the n-th dictionary.

The executing unit (206) executes compiled code according to the present invention, other compiled code, or code using the interpreter. The executing unit (206) can execute the compiled code or other compiled code any time after compiling. For example, execution of the compiled code can be started immediately after compiling, execution of the compiled code can be started by starting the initial target code after compiling, execution of the compiled code can be started when a certain method is to be executed after compiling, or the compiled code can be executed during execution of target code by the interpreter after compiling. However, the present invention is not limited to these examples. Also, the executing unit (206) can execute some code executable by the interpreter before execution of the compiled code or other compiled code, parallel to execution of the compiled code or other compiled code, or after execution of the compiled code or other compiled code.

The monitoring unit (207) can monitor changes related to dictionaries referenced to search one or more dictionaries. In other words, it can monitor changes related to up to the n-th dictionary. Alternatively, the monitoring unit (207) can monitor changes related to all dictionaries, whether there is one or a plurality of dictionaries.

The monitoring unit (207) can start monitoring changes related to dictionaries immediately after compiled code according to the present invention or other compiled code has been generated, or immediately after code has been executed by the interpreter. The monitoring of changes related to dictionaries is started immediately after generation of other compiled code because changes related to dictionaries often occur during execution of other compiled code or during execution of code by the interpreter.

In response to the detection of a change related to a dictionary among one or more dictionaries by the monitoring unit (207), the comparing unit (208) compares the order m (where m is an integer equal to or greater than 1) in the predetermined order of the dictionary in which a change was detected to, for example, the order n recorded in the metadata (213). In other words, the comparing unit (208) determines whether the order m>the order n, the order m=the order n, or the order m<the order n. In order to make this determination, the comparing unit (208) identifies the compiled code associated with the dictionary in which a change has been detected. For example, the order n can be extracted from the metadata (213) associated with the identified compiled code.

The comparing unit (208) can perform the comparison during execution of any code, that is, during execution of compiled code according to the present invention or other compiled code, or during execution of code by the interpreter. The reason the comparison can be performed using compiled code other than compiled code according to the present invention is because an operation such as "removal of a certain symbol" can be written to any position accessible to a certain symbol in the program.

The invalidating unit (209) invalidates code optimized by optimization using replacement with extracted values, among compiled code associated with a dictionary in which a change was detected, in response to the results from the orders comparison performed by the comparing unit (208) and the type of change. The invalidation method can be any of the following methods:

(a) Execution by the interpreter without using compiled code when invalidation is necessary;
(b) Execution once by the interpreter when invalidation is necessary, and recompiling without optimization using value replacement and execution of the recompiled code during the next execution; or
(c) Preparing previously optimized code using value replacement as well as code not optimized using value replacement, executing the previously optimized code first, and then executing the unoptimized code when invalidation is required.

The results of the orders comparison are the order m>the order n, the order m=the order n, or the order m<the order n. The types of changes related to dictionaries include adding a key, deleting a key, updating using the same value or a different value, or changing a dictionary address.

Compiled code associated with a dictionary can be code in which a symbol in the dictionary such as a global variable or a global function is replaced in the code by a constant.

The invalidation conditions for the invalidating unit (209) are explained in detail below with reference to FIG. 7a through FIG. 7c.

The invalidating unit (209) can perform the invalidation during execution of any code, that is, during execution of compiled code according to the present invention or other compiled code, or during execution of code by the interpreter. The reason the invalidation can be performed using compiled code other than compiled code according to the present invention is because an operation such as "removal of a certain symbol" can be written to any position accessible to a certain symbol in the program.

The storage device (210) can store code (221) and compiled code (222). Also, the storage device (210) can store one or more dictionaries (223). Here, "dictionary (223)" can refer to a single dictionary or to a plurality of dictionaries.

The code (221) is code to be optimized, or code in which some or all of the code is code to be optimized. There are no particular restrictions on the code (221) as long as it is in a language that enables values associated with a symbol name to be extracted from a dictionary (223) using the symbol name as a key. A symbol that can be used in an embodiment of the present invention is one with a value that is difficult to change in the symbol. In other words, the information is very difficult to alter during a change. Examples of symbols include variables, functions, jump destinations in methods, and built-in functions. However, the present invention is not limited to these examples.

The compiled code (222) can include compiled code according to the present invention or other compiled code. Also, the compiled code (222) can be code compiled by the compiling unit (203) or code already compiled by another computer.

The dictionary (223) can be stored in the non-volatile storage device (210). The "dictionary (223)" can be used interchangeably with the "dictionary (211)" in the following explanation.

Figure 3:
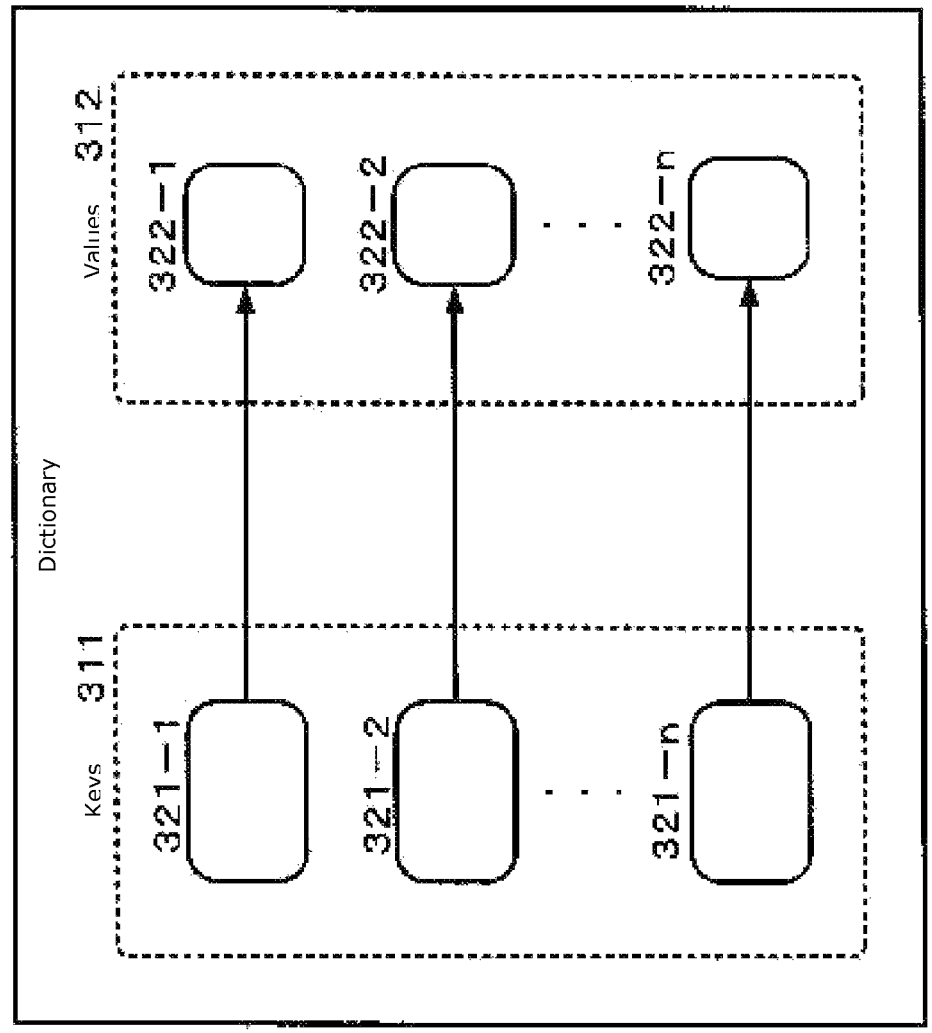
FIG. 3 shows a dictionary that can be according to an embodiment of the present invention.

FIG. 3 shows a dictionary that can be used in an embodiment of the present invention. The dictionary has one or more sets of keys and values associated with these keys. The dictionary can take a form defined by, for example, the Python language. In another language, the dictionary can be referred to by the name "associated memory" or "associative array". In the present invention, "dictionary" includes associated memory, associative arrays, and other forms indexed using keys and called by other names.

The dictionary (301) schematically illustrates one of the dictionaries (211, 223) shown in FIG. 2. The dictionary (301) has one or more sets or "pairs" of keys (311) and values (312) associated with keys (311). In FIG. 3, the dictionary (301) includes set 321-1 and 322-1, set 321-2 and 322-2, and set 321-n and 322-n. A key and value are, respectively, a name and stored value. More specifically, a key is written in a program, and a value is a number or character embedded during execution. The keys and values are not ordered in the dictionary, but the keys have to be unique in the dictionary.

The keys can take any unchangeable form. A string or numerical value can be used as a key. A tuple can be used as a key if it contains only strings, numerical values, and other tuples. A tuple including directly and indirectly changeable objects cannot be used as a key. Also, a list cannot be used as a key. This is because a list can be changed in place when a slice or indexing is substituted for the list, for example, when a method such as append or extend is used.

The values are uniquely determined by the keys. A value can be used in optimization to replace a symbol in a code, that is, to turn a symbol in a code into a constant.

Methods for creating dictionaries are well known in the art. For example, a dictionary can be created in the Python language using "PyDictObject" as shown in the reference "Dictionary Objects", Python v2.6.5c2 documentation.

Methods for using a dictionary are also well known in the art, and include adding keys, deleting keys, performing updates using the same value or a different value, and changing the address of a dictionary. For example, a method for using a dictionary created to execute a program written in the Python language is disclosed in the source code of the Python language as shown in FIG. 9 and the section of the detailed description of the present invention corresponding to this drawing. There are not very many dictionary address changes in the Python language, so this can be disregarded.

In the Python language, the order for dictionaries of global variables or functions and dictionaries of built-in variables or functions is dictionaries of global variables or functions followed by dictionaries of built-in variables or functions. Therefore, when a value is determined from a symbol, the dictionaries have to be referenced in the predetermined order.

When the predetermined order is the order 1, 2, ..., k where k is an integer, the value paired with a given symbol is extracted in the following way. The symbol is looked up in the 1st dictionary. When there is a value paired with the symbol, the value is extracted. When there is no value paired with the symbol, the symbol is looked up on the 2nd dictionary. This operation is repeated if necessary.

Figure 4:
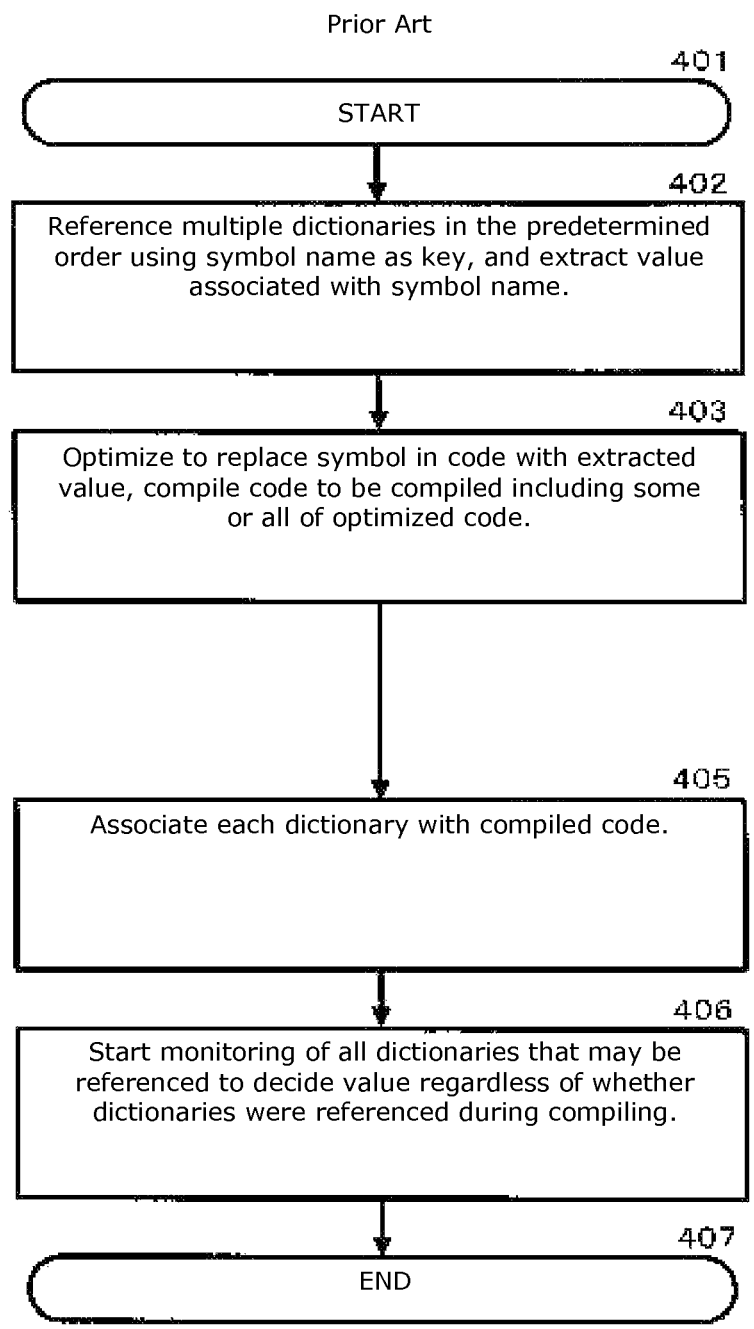
FIG. 4 shows a flowchart of the processing performed during the compiling of code in the prior art.

FIG. 4 shows a flowchart of the processing performed during the compiling of code in the prior art where the code compiling process according to the prior art. In Step 401, the computer starts the code compiling process using the compiler. In Step 402, the computer searches the dictionaries in the predetermined order using a symbol name as the key, and extracts the value associated with the key from a dictionary. The computer then stores the extracted value, for example, in the memory.

In Step 403, the computer performs the code optimization process by replacing the symbol in the code, such as the global variable or function or the built-in variable or function, with the extracted value. Next, the computer compiles the code to be compiled including some or all of the optimized code. The computer then stores the compiled code generated in the compiling process in the storage device or memory.

In Step 405, the computer associates each dictionary with the compiled code. The computer can record the associated data in, for example, the metadata associated with the compiled code.

In Step 406, the computer begins to monitor all of the dictionaries that can be referenced to determine a value. This monitoring of dictionaries is performed regardless of whether a given dictionary was referenced during the compiling process. In other words, the $2^{nd}$ dictionary and thereafter are monitored when multiple dictionaries have been referenced and the value was extracted in the $1^{st}$ dictionary. Thus, a plurality of dictionaries can be monitored.

In Step 407, the computer ends the compiling process, and awaits executing an instruction for the compiled code generated by the compiling process in Step 403 otherwise known as the "compiled code" in the explanation of FIG. 5 below, or awaits executing an instruction for other compiled code referencing this compiled code otherwise known as the "other compiled code" in the explanation of FIG. 5 below or executing code by the interpreter.

Figure 5:
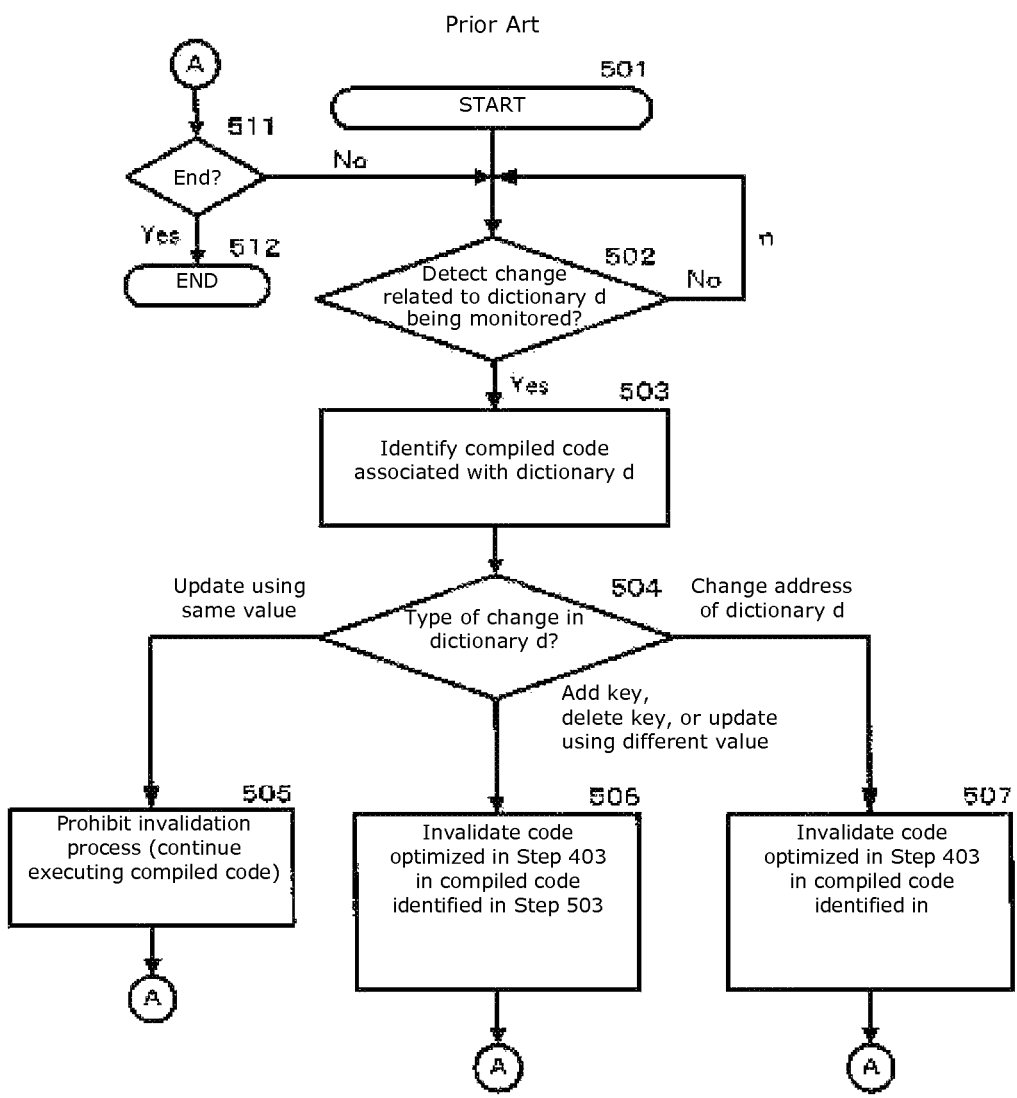
FIG. 5 shows a flowchart of the processing performed during execution of compiled code according to the prior art.

FIG. 5 shows a flowchart of the processing performed during execution of compiled code in the runtime processing of the prior art. In Step 501, the computer begins to execute the compiled code or other compiled code, or executes code using the interpreter. In Step 502, the computer detects changes related to the dictionary d being monitored. The changes related to the dictionary d being monitored include the addition of keys, deletion of keys, updates using the same value or a different value, or dictionary address changes. In response to the detection of a change related to dictionary d being monitored, the computer proceeds with the process to Step 503. If no change related to the dictionary d being monitored is detected, that is, no changes are detected other than changes to any dictionary during execution of the program, the computer returns the process to Step 502, and monitoring of the dictionary d is continued. In other words, the computer performs processing until a change is detected that is related to the dictionary d being monitored.

In Step 503, the computer identifies the compiled code associated with the dictionary d in which a change was detected in Step 502 from the data associating each dictionary with compiled code which is recorded in the metadata explained in Step 405 of FIG. 4.

In Step 504, the computer identifies the type of change in the dictionary d. When the type of change in the dictionary d is the addition of a key, the deletion of a key, an update using the same value or a different value, or a dictionary address change, the following is performed:

When the type of change in the dictionary d is an update using the same value, the computer proceeds with the process to Step 505.

When the type of change in the dictionary d is the addition of a key, the deletion of a key or an update using a different value, the computer proceeds with the process to Step 506.

When the type of change in the dictionary d is a change in the address of the dictionary d, the computer proceeds with the process to Step 507.

In Step 505, the computer prohibits the invalidation process in Step 403 in response to the type of change in the dictionary d being an update using the same value. The computer then returns the process to Step 511.

In Step 506, in response to the type of change in the dictionary d being the addition of a key, the deletion of a key, or an update using a different value, the computer invalidates the code optimized in Step 403, that is, replacement of the global variable in the code with the value extracted in Step 402, in the compiled code associated with the dictionary d in which a change was detected in Step 502. When there is more than one compiled code associated with the dictionary d, all of the code is invalidated. The computer then returns the process to Step 511.

In Step 507, in response to the type of change in the dictionary d being a change in the address of the dictionary d, the computer invalidates the code optimized in Step 403 in the compiled code associated with the dictionary d in which a change was detected in Step 502. The computer then returns the process to Step 511.

In Step 511, the computer determines whether or not all of the code targeted for execution has ended. When all of the code targeted for execution has been ended, the computer proceeds with the process to Step 512, and the execution of all of the code to be executed is ended. When all of the code targeted for execution has not ended, the computer returns the process to Step 502. Next, the computer repeats the operations described in the flowchart of FIG. 5 each time a change is detected in the monitored dictionary d.

Figure 6:
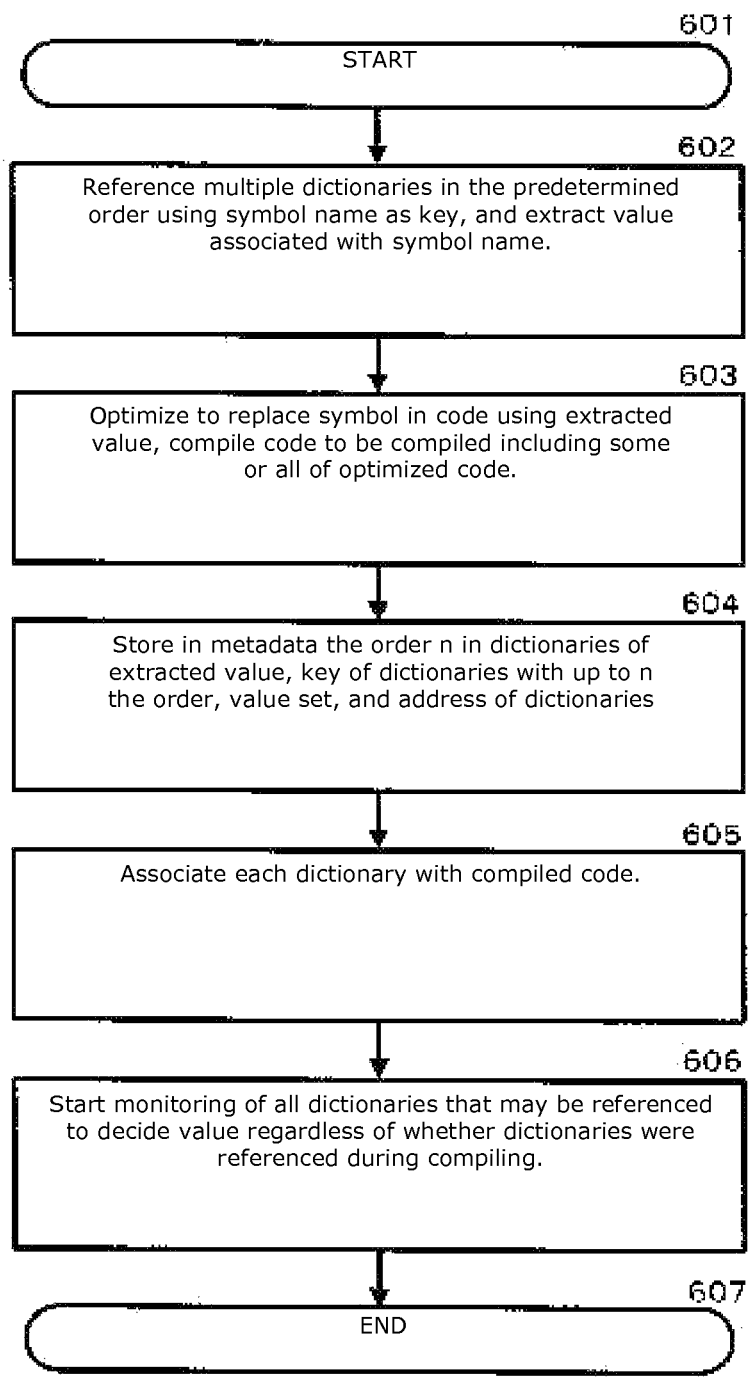
FIG. 6 shows a flowchart of the processing performed during the compiling of code according to an embodiment of the present invention.

FIG. 6 shows a flowchart of the processing performed during the compiling of code in an embodiment of the present invention. In Step 601, the compiling unit (203) starts the code compiling process. The code can be a program written according to the specifications of the Python language. In Step 602, the extracting unit (204) searches the dictionaries (211) in a predetermined order using a symbol name as a key, and the value associated with the key is extracted from the dictionary. The extracting unit (204) stores the extracted value, for example, in the memory (202). When there is one dictionary (211), the one dictionary is searched. When there is more than one dictionary (211), the dictionaries can be searched, for example, in the priority order associated with each dictionary, or in the predetermined priority order for referencing dictionaries in the programming language.

In Step 602, when there is a plurality of global variable or function dictionaries and built-in variable or function dictionaries, the predetermined order is the global variable or function dictionaries followed by the built-in variable or function dictionaries. Therefore, when the $1^{st}$ order is given precedence over the $2^{nd}$ order, the global variable or function dictionaries are in the $1^{st}$ order, and the built-in variable or function dictionaries are in the $2^{nd}$ order.

In Step 603, the optimizing unit (205), as the code optimizing process, replaces the symbol in the code, for example, the global variable or function or the built-in variable or function, with the extracted value. The code with the symbol can be code determined by the value in the referencing of the dictionaries. The symbol in the code can be, for example, a global variable. In other words, optimization is performed in which a symbol in code is replaced by the value, and this value is treated as a constant.

The compiling unit (203) then compiles the code to be compiled including some or all of the optimized code. The code to be compiled is among the code to be executed. In other words, the code to be compiled is code to be compiled including some or all of the optimized code among the code to be executed. The reason for some of the optimized code is that it provides a choice to execute the code using the interpreter without any compiling.

The compiling unit (203) stores the compiled code according to the present invention or other compiled code (222, 212), for example, in the storage device (210) or in the memory (202).

In Step 603, when the dictionary in which a value has been extracted corresponding to the symbol name is a global variable or function dictionary, the optimization is performed by replacing the global variable or function reference with the extracted value, and treating the value as a constant.

In Step 603, when the dictionary in which a value has been extracted corresponding to the symbol name is a variable or function dictionary, the optimization is performed by replacing the variable or the callee of the function determined to be rarely updated or very infrequently updated during execution with the extracted value, and treating the value as a constant. A variable or function determined to be rarely updated during execution can be, for example, a built-in variable or function. In a static determination of a built-in variable or the callee of the function, the symbol name is replaced by the value. When the symbol name "max" appears in the code, a dictionary is referenced, the jump destination paired with "max" that is, the callee is replaced by the value, and the value is treated as a constant. For infrequently updated dictionaries, see reference, "Evaluating the dynamic behaviour of Python applications." by Alex Holkner et al In Step 604, the compiling unit (203) records, for example, in the metadata (213), the order n identified in Step 602, the key and value sets of the dictionaries up to the order n, and the addresses of the dictionaries up to the order n. The metadata (213) can be associated with the compiled code (212, 222) so that it is referenced in the processing shown in FIG. 7a through FIG. 7c. The order n recorded in the metadata (213) can be referenced to compare orders in Step 704 of the flowchart shown in FIG. 7a. The key and value sets recorded in the metadata (213) can be referenced in Step 721 of the flowchart shown in FIG. 7c and Step 731 of the flowchart shown in FIG. 7c to determine whether the type of change in the dictionary d is the addition of a key, the deletion of a key, or an update using the same value or a different value. The dictionary addresses recorded in the metadata (213) can be referenced in Step 721 of the flowchart shown in FIG. 7b and Step 731 of the flowchart shown in FIG. 7c to determine whether the type of change in the dictionary d is an updated dictionary address.

In Step 605, the compiling unit (203) associates each dictionary with compiled code. The compiling unit (203) can record the associated data in the metadata (213) associated with the compiled code.

In Step 606, the monitoring unit (207) begins to monitor all of the dictionaries that can be referenced to determine a value. This monitoring of dictionaries is performed regardless of whether a given dictionary was referenced during the compiling process. In other words, the $2^{nd}$ dictionary and thereafter are monitored when multiple dictionaries have been referenced and the value was extracted in the $1^{st}$ dictionary. Thus, a plurality of dictionaries can be monitored. By starting the monitoring process, changes related to dictionaries can be detected in the flowchart for executing code shown in FIG. 7a through FIG. 7c.

In Step 607, the compiling unit (203) ends the compiling process, and the executing unit (206) awaits executing an instruction for any code, such as executing an instruction for the compiled code or other compiled code, or code executed by the interpreter. The computer then proceeds with process to Step 701 of FIG. 7a.

In the compiling process according to the present invention, more steps are executed by the processing in Step 604 than in the compiling process of the prior art. Therefore, more compiling is performed in the present invention. However, the additional processing requires less than 1% of the overall compiling time. Also, the additional processing is effective for the ability to determine the conditions for invalidating the execution of compiled code in the processing shown in FIG. 7a through FIG. 7c.

Figure 7A:
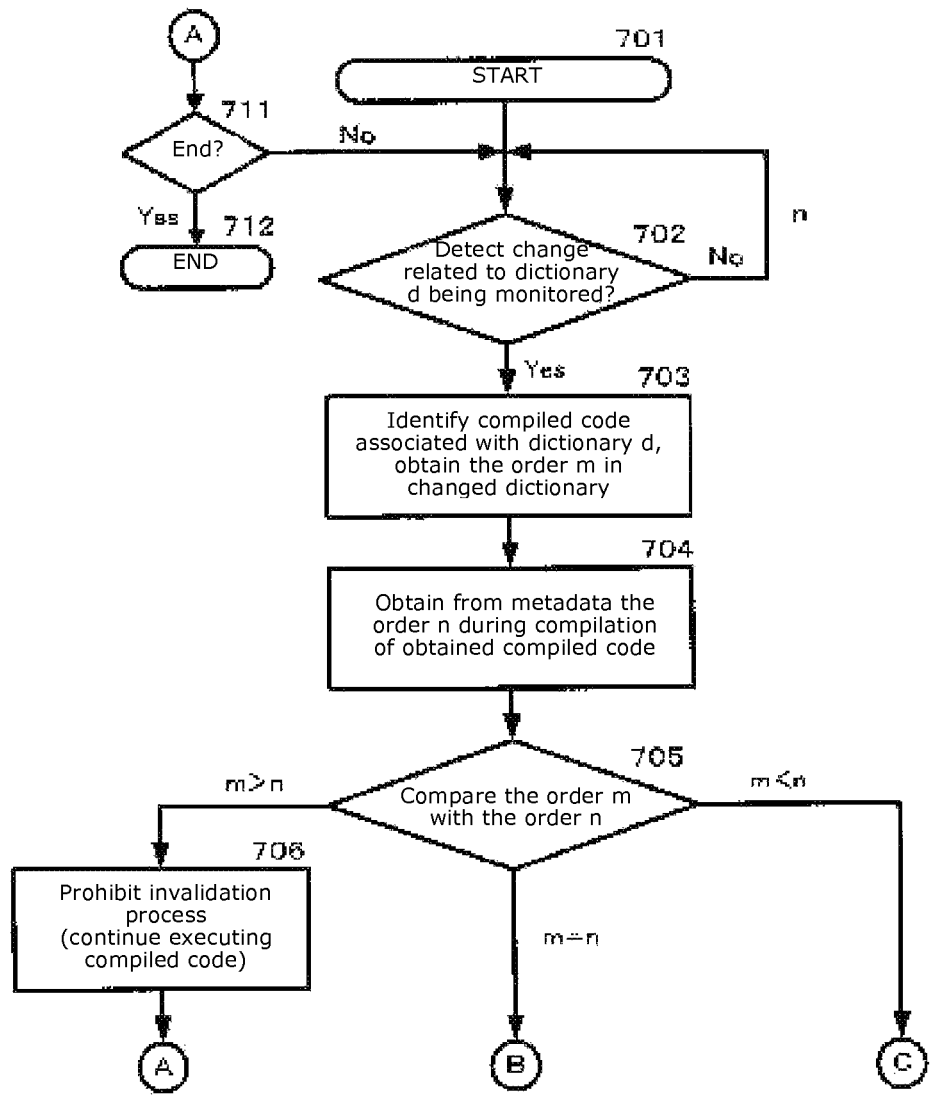
FIG. 7a shows a flowchart of the processing performed during execution of any code i according to an embodiment of the present invention.
Figure 7B:
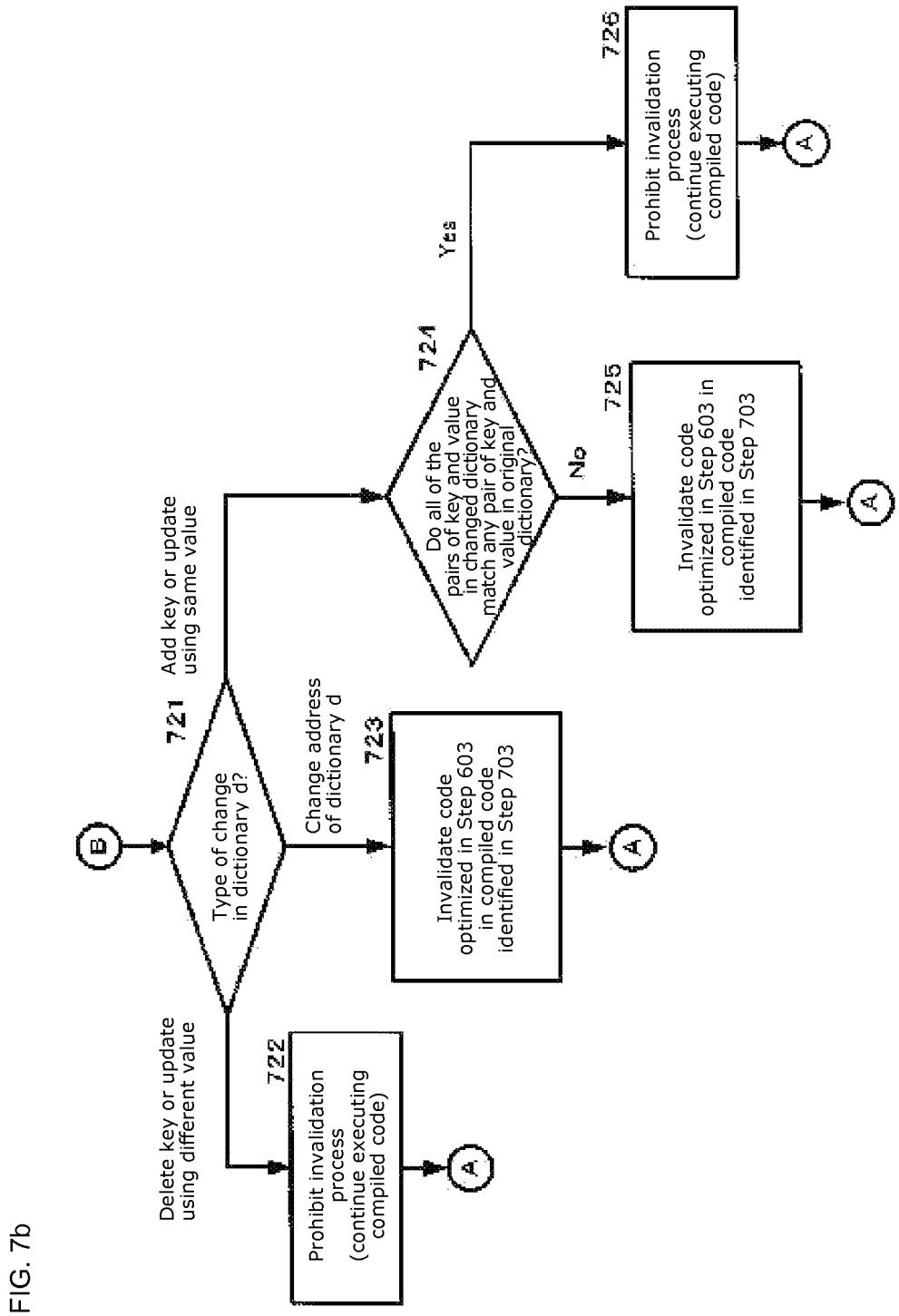
FIG. 7b shows a flowchart of the processing performed during execution of any code 7b when the order m=the order n is satisfied, according to an embodiment of the present invention.
Figure 7C:
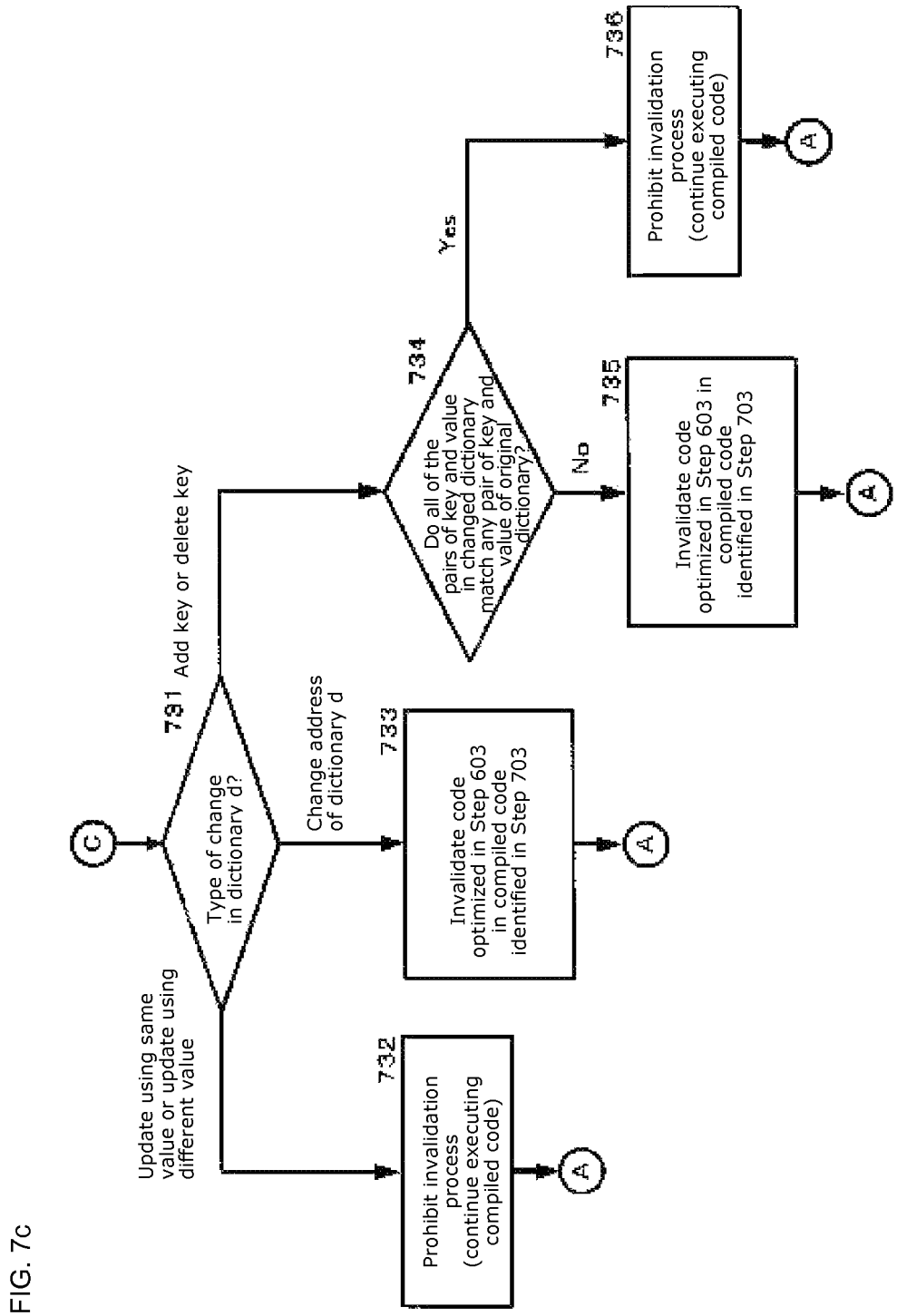
FIG. 7c shows a flowchart of the processing performed during execution of any code 7b when the order m<the order n is satisfied, according to an embodiment of the present invention.

FIG. 7a through FIG. 7c show flowcharts of the processing performed during execution of any code in an embodiment of the present invention, for example, during execution of the compiled code or any other compiled code, or during execution of code by an interpreter which shows flowcharts of runtime processing according to the present invention.

The following is an explanation with reference to FIG. 7a. In Step 701, the executing unit (206) begins execution of any code, for example, execution of the compiled code or any other compiled code, or execution of code by an interpreter.

In Step 702, the monitoring unit (207) detects any change in the dictionary d being monitored. The changes related to the dictionary d being monitored include the addition of keys, deletion of keys, updates using the same value or a different value, or dictionary address changes. In response to the detection of a change related to dictionary d being monitored, the monitoring unit (207) proceeds with the process to Step 703. If no change related to the dictionary d being monitored is detected, that is, no changes are detected other than changes to any dictionary during execution of the program, the monitoring unit (207) returns the process to Step 702, and monitoring of the dictionary d is continued.

In Step 703, the comparing unit (208) identifies the compiled code associated with a dictionary d in which a change was detected in Step 702 from the data associating each dictionary with the compiled code which is recorded in the metadata (213) explained in Step 605 of FIG. 6. Also, the comparing unit (208) acquires the order m in the predetermined order of the dictionary in which a change was detected in Step 702.

In Step 704, the comparing unit (208) acquires from the metadata (213) recorded in Step 604 of FIG. 6 the order n identified in Step 602 of FIG. 6. In Step 705, the comparing unit (208) compares the size of the order n acquired in Step 704 to the order m acquired in Step 703.

When the order m>the order n, the comparing unit (208) proceeds with the process to Step 706.

When the order m=the order n, the comparing unit (208) proceeds with the process to Step 721 in FIG. 7b.

When the order m<the order n, the comparing unit (208) proceeds with the process to Step 731 in FIG. 7c.

In Step 706, the invalidating unit (209), in response to m>n, prohibits the invalidation process in other words, the invalidation process is not performed. Then, the invalidating unit (209) returns the process to Step 711.

In Step 711, the executing unit (206) determines whether or not all of the code, for example, all of the code targeted for execution, has ended. When all of the code targeted for execution has been ended, the executing unit (206) proceeds with the process to Step 712, and ends the monitoring process. When the execution of compiled code has not ended, the executing unit (206) returns the process to Step 702. Next, the monitoring unit (207) repeats the operations described in the flowcharts of FIG. 7a through FIG. 7c each time a change is detected in a dictionary d being monitored.

The following is an explanation of FIG. 7b when the order m=the order n is satisfied. In Step 721, the comparing unit (208) identifies the type of change in the dictionary d. When the type of change in the dictionary d is the addition of a key, the deletion of a key, an update using the same value or a different value, or a dictionary address change, the following is performed:

When the type of change in the dictionary d is the addition of a key or an update using the same value, the comparing unit (208) proceeds with the process to Step 722.

When the type of change in the dictionary d is the deletion of a key or an update using a different value, the comparing unit (208) proceeds with the process to Step 723.

When the type of change in the dictionary d is a change in the address of the dictionary d, the computer proceeds with the process to Step 724.

In Step 722, in response to m=n and the type of change in the dictionary d being the addition of a key or an update using the same value, the invalidating unit (209) prohibits the invalidation process. Then, the invalidating unit (209) returns the process to Step 711.

In Step 723, in response to m=n and the type of change in the dictionary d being the deletion of a key or an update using a different value, the invalidating unit (209) invalidates code optimized in Step 603 by replacement with the value extracted in Step 602 in the compiled code associated with the dictionary d in which a change was detected in Step 702. Then, the invalidating unit (209) returns the process to Step 711.

In Step 724, the comparing unit (208) determines whether or not all pairs of keys and values in the dictionary after an address change referred to as the changed dictionary below, completely match any pair of keys and values in the dictionary before the address change, referred to as the original dictionary below.

When one of pair of keys and values in the changed dictionary does not match any pair of keys and values in the original dictionary, that is, one of pair of keys and values in the changed dictionary do not match at least one of pair of keys or values of the original dictionary, the comparing unit (208) proceeds with the process to Step 725.

When all pairs of keys and values in the changed dictionary completely match any pair of keys and values of the original dictionary, the comparing unit (208) proceeds with the process to Step 726. The comparing unit (208) can obtain the keys and values of the original dictionary from the metadata (213).

In Step 725, in response to m=n and one pair of the keys and values in the changed dictionary not matching any pair of keys and values in the original dictionary, the invalidating unit (209) invalidates the code optimized in Step 603 by replacement with the value extracted in Step 602 in the compiled code associated with the dictionary d in which a change was detected in Step 702. Then, the invalidating unit (209) returns the process to Step 711.

In Step 726, in response to m=n and all pairs of keys and values of the changed dictionary completely matching any pair of keys and values of the original dictionary, the invalidating unit (209) prohibits the invalidation process. Then, the invalidating unit (209) returns the process to Step 711.

The following is an explanation of FIG. 7c when the order m<the order n is satisfied. In Step 731, the comparing unit (208) identifies the type of change in the dictionary d. When the type of change in the dictionary d is the addition of a key, the deletion of a key, an update using the same value or a different value, or a dictionary address change, the following is performed:

When the type of change in the dictionary d is an update using the same value or an update using a different value, the comparing unit (208) proceeds with the process to Step 732.

When the type of change in the dictionary d is the addition of a key or the deletion of a key, the comparing unit (208) proceeds with the process to Step 733.

When the type of change in the dictionary d is a change in the address of the dictionary d, the computer proceeds with the process to Step 734.

In Step 732, in response to m<n and the type of change in the dictionary d being an update using the same value or an update using a different value, the invalidating unit (209) prohibits the invalidation process. Then, the invalidating unit (209) returns the process to Step 711.

In Step 733, in response to m<n and the type of change in the dictionary d being the addition of a key or the deletion of a key, the invalidating unit (209) invalidates code optimized in Step 603 by replacement with the value extracted in Step 602 in the compiled code associated with the dictionary d in which a change was detected in Step 702. Then, the invalidating unit (209) returns the process to Step 711.

In Step 734, the comparing unit (208) determines whether or not all pairs of keys and values in the dictionary after an address change referred to as the changed dictionary below completely match any pair of keys and values in the dictionary before the address change referred to as the original dictionary below.

When one of the keys in the change dictionary does not match any key in the original dictionary, the comparing unit (208) proceeds with the process to Step 735.

When all of the keys in the change dictionary match any key of the original dictionary, the comparing unit (208) proceeds with the process to Step 736.

The comparing unit (208) can extract the keys of the original dictionary in which a change has been detected from the metadata (213).

In Step 735, in response to m<n and one of the keys in the changed dictionary not matching any key in the original dictionary, the invalidating unit (209) invalidates the code optimized in Step 603 by replacement with the value extracted in Step 602 in the compiled code associated with the dictionary d in which a change was detected in Step 702. Then, the invalidating unit (209) returns the process to Step 711.

In Step 736, in response to m<n and all of the keys in the changed dictionary matching any key in the original dictionary, the invalidating unit (209) prohibits the invalidation process. Then, the invalidating unit (209) returns the process to Step 711.

As shown in FIG. 7a through FIG. 7c, the conditions for invalidating code optimized in Step 603 by replacement with a value extracted in Step 602 in the compiled code associated with a dictionary in which a change was detected are as follows:

- The order m is less than the order n, the change related to the dictionary is the addition of a key, the deletion of a key, or a change in the address of the dictionary, and a key in the dictionary in which an address change occurred does not match any key of the dictionary before the address was changed; or
- The order m is equal to the order n, the change related to the dictionary is the addition of a key, the deletion of a key, or a change in the address of the dictionary, and at least a pair of key and value in the dictionary in which an address change occurred does not match any pair of key or value of the dictionary before the address was changed.

However, when the order m is greater than the order n, compiled code associated with the dictionary in which a change was detected is not invalidated regardless of the type of change related to the dictionary.

The conditions for invalidating code optimized in Step 603 by replacement with a value extracted in Step 602 in the compiled code associated with a dictionary in which a change was detected can be summarized as follows:

- When the order n is 1, that is, when the speculative optimization has been performed as symbol replacement using a value from the 1st dictionary (n=1),
  - the change related to the dictionary is deletion of a key or an update using a different value where the order m is 1 (m=n);
- When the order is greater than 1 (n>1), that is, when the speculative optimization has been performed as symbol replacement using a value from the $2^{nd}$ or greater order dictionary,
  - the change related to the dictionary is addition of a key or deletion of a key where the order m is from 1 to n−1 (m=1 to n−1);
  - the change related to the dictionary is deletion of a key or an update using a different value where the order m is equal to n (m=n);
- When the order n is equal to or greater than 1 (n≥1), that is, when the speculative optimization has been performed as symbol replacement using a value from the $1^{st}$ or greater order dictionary,
  - the change related to the dictionary is an address change in the dictionary, and a key in the dictionary after the change does not match any key in the dictionary before the change where the order m is from 1 to n−1 (m=1 to n−1); or
  - the change related to the dictionary is an address change in the dictionary, and a key or value in the dictionary after the change does not match any key or value in the dictionary before the change where the order m equals to n (m=n).

However, compiled code associated with a dictionary in which a change has been detected is not invalidated under the following conditions:

- When the order n is 1 (n=1), and
  - the order m is equal to or greater than 2, regardless of the type of change related to the dictionary; or
- When the order n is equal to or greater than 1, and
  - the order m is n+1 or greater regardless of whether the address of the dictionary was changed or not changed.

When a plurality of dictionaries includes global variable or function dictionaries and built-in variable or function dictionaries, and the dictionary from which a value associated with a symbol name is a global variable or function dictionary, the conditions under which code optimized in Step 603 using replacement by the value extracted in Step 602 in the compiled code associated with the dictionary in which a change was detected is invalidated can be summarized as follows:

- The change related to the global variable or function dictionary is deletion of a key or an update using a different value where the order m is 1; or
- The change related to the global variable or function dictionary is a change in dictionary address, and at least a pair of keys and values in the dictionary after the address change does not match any pair of keys and values in the dictionary before the address change where the order m is 1.

However, compiled code associated with a dictionary in which a change has been detected is not invalidated under the following conditions:

- The order m is 2 regardless of the type of change related to a built-in variable or function dictionary.

When a plurality of dictionaries includes global variable or function dictionaries and built-in variable or function dictionaries, and the dictionary from which a value associated with a symbol name is a built-in variable or function dictionary, the conditions under which code optimized in Step 603 using replacement by the value extracted in Step 602 in the compiled code associated with the dictionary in which a change was detected is invalidated can be summarized as follows:

- The change related to the global variable or function dictionary is addition of a key or deletion of a key where the order m is 1;
- The change related to the built-in variable or function dictionary is deletion of a key or an update using a different value where the order m is 2;
- The change related to the global variable or function dictionary is a change in dictionary address, and the key in the dictionary after the address change does not match any key in the dictionary before the address change where the order m is 1; or
- The change related to the built-in variable or function dictionary is a change in dictionary address, and at least one of pair of keys and values in the dictionary after the address change does not match any pair of keys and values in the dictionary before the address change where the order m is 2.

When there is a single dictionary, m=n=1. When m=n=1, code optimized in Step 603 using replacement with the value extracted in Step 602 in the compiled code associated with the dictionary in which a change was detected is invalidated on condition that the address of the dictionary was changed, and a pair of keys and values in the dictionary after the address change does not match any pair of keys and values in the dictionary before the address change. In this way, the present invention is effective even when there is only one dictionary.

As shown in FIG. 7a through FIG. 7c, the conditions for continuing execution of compiled code associated with a dictionary in which a change was detected are as follows:

- The order m is less than the order n, the change related to the dictionary is an update using the same value or a different value, or a change in the address of the dictionary, and all of the keys in the dictionary in which the address change occurred matches any key in the dictionary before the address was changed;
- The order m is equal to the order n, the change related to the dictionary is the addition of a key, an update using the same value, or a change in the address of the dictionary, and at least a pair of keys and values in the dictionary in which an address change occurred does not match any pair of keys and values in the dictionary before the address was changed; or The order m is greater than the order n regardless of the type of change related to the dictionary.

The conditions for continuing execution of compiled code associated with a dictionary in which a change was detected can be summarized as follows:

When the order n is 1 (n=1), that is, when the speculative optimization has been performed as symbol replacement using a value from the 1st dictionary,
  the change related to the dictionary is addition of a key or an update using the same value where the order m is 1 (m=n);
  the change related to the dictionary is addition of a key, deletion of a key, or an update using the same value or a different value where the order m is 2 (m>n);

When the order n is greater than 1 (n>1), that is, when the speculative optimization has been performed as symbol replacement using a value from the $2^{nd}$ or greater order dictionary,
  the change related to the dictionary is an update using the same value or a different value where the order m is from 1 to n−1 (m=1 to n−1);
  the change related to the dictionary is addition of a key or an update using the same value where the order m is equal to n (m=n);
  the change related to the dictionary is addition of a key, deletion of a key, or an update using the same value or a different value where the order m is equal to or greater than n+1 (m≥n+1);

When the order n is equal to or greater than 1 (n≥1), that is, when the speculative optimization has been performed as symbol replacement using a value from the $1^{st}$ or greater order dictionary,
  the change related to the dictionary is an address change in the dictionary, and a key in the dictionary after the change matches a key in the dictionary before the change where the order m is from 1 to n−1 (m=1 to n−1);
  the change related to the dictionary is an address change in the dictionary, and the key and value in the dictionary after the change matches either the key or value in the dictionary before the change where the order m is equal to n (m=n); or
  the order m is equal to or greater than n+1 (m≥n+1) regardless of whether or not the address of the dictionary was changed.

When a plurality of dictionaries includes global variable or function dictionaries and built-in variable or function dictionaries, and the dictionary in which a value associated with the symbol name has been extracted is a global variable or function dictionary, the conditions under which execution of compiled code associated with the dictionary in which a change was detected can be summarized as follows:
  The change related to the global variable or function dictionary is addition of a key or an update using the same value where the order m is 1;
  The change related to the built-in variable or function dictionary is addition of a key, deletion of a key or an update using the same value where the order m is 2;
  The change related to the global variable or function dictionary is a change in dictionary address, and all of the pairs of s keys and values in the dictionary after the address change match any pair of the keys and values in the dictionary before the address change where the order m is 1; or
  The order m is 2 regardless of whether or not the address of the built-in variable or function dictionary has been changed.

When a plurality of dictionaries includes global variable or function dictionaries and built-in variable or function dictionaries, and the dictionary in which a value associated with the symbol name has been extracted is a built-in variable or function dictionary, the conditions under which execution of compiled code associated with the dictionary in which a change was detected can be summarized as follows:
  The change related to the global variable or function dictionary is an update using the same value or a different value where the order m is 1;
  The change related to the built-in variable or function dictionary is addition of a key, or an update using the same value where the order m is 2;
  The change related to the global variable or function dictionary is a change in dictionary address, and the key in the dictionary after the address change matches the key in the dictionary before the address change where the order m is 1; or
  The change related to the built-in variable or function dictionary is a change in dictionary address, and all of the pairs of keys and values in the dictionary after the address change match any pair of the keys and values in the dictionary before the address change where the order m is 2.

Figure 8A:
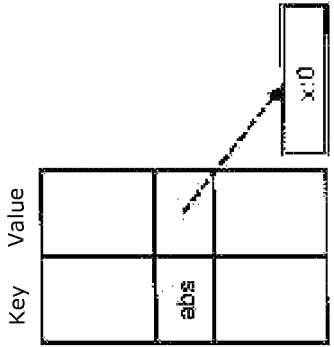
FIG. 8a shows how a user rewrites a built-in function dictionary in the Python language which can be used in an embodiment of the present invention.
Figure 8A:
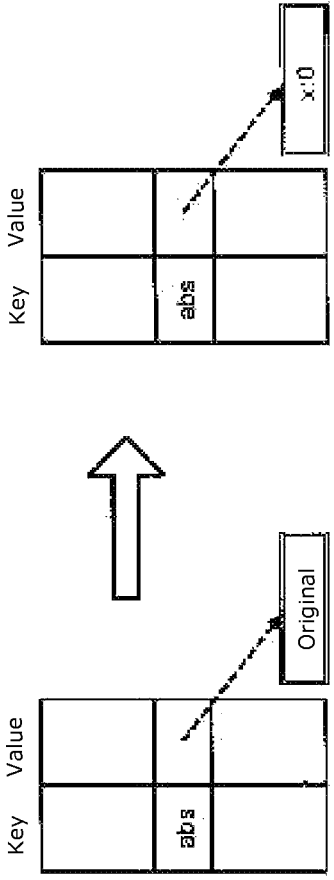

FIG. 8a shows how a user rewrites a built-in function dictionary in the Python language which can be used according to an embodiment of the present invention. In the screen display indicated by reference sign 801, numbers 01 through 18 have been added to facilitate the explanation. These numbers do not have to be displayed on the screen.

In this example, the jump destination, callee of built-in function "abs" has been rewritten to jump destination "x:0". The diagram indicated by reference sign 801 shows a built-in function dictionary (211) after function "abs" has been added to the dictionary (211) as a key in lines 05 through 10.

Line 04 shows the addition of a display command for the key of the built-in function.

Line 05 shows the addition of key "abs".

Line 13 shows the jump destination of key "abs" rewritten from the original to "x:0".

The diagrams indicated by reference sign 811 and reference sign 812 show the key and value in the built-in function dictionary.

In the diagram indicated by reference sign 811, when key "abs" is present in the built-in function dictionary, the jump destination of the key is still the original destination.

The diagram indicated by reference sign 812 shows the jump destination of the built-in function rewritten from the original to "x:0" by rewriting the built-in function dictionary.

FIG. 8b shows how a user rewrites to declare the same name using a global variable as the name of the built-in function in the Python language which can be used in an embodiment of the present invention. In the screen display indicated by reference sign 801, numbers 01 through 16 have been added to facilitate the explanation. These numbers do not have to be displayed on the screen.

In this example, "999" has been entered in an empty dictionary using global function "abs". The diagram indicated by reference sign 821 is rewritten so key "abs" added in FIG. 8a using the global variable is declared by the same name in the built-in function.

Line 06 indicates that key "abs" is declared using a global variable.
Line 07 indicates that "999" is the value associated with this key.

The diagrams indicated by reference sign 831 and reference sign 832 indicate the key and value in the global variable dictionary.

In the diagram indicated by reference sign 831, there is no key and no variable assigned to the key otherwise known as empty dictionary.

In the diagram indicated by reference sign 832, the command indicated in lines 06 and 07 have stored key "abs" and value "999" associated with this key in the global variable dictionary.

In FIG. 8a and FIG. 8b, a search is performed on the global variable dictionary followed by the built-in function dictionary when abs( ) is called up.

FIG. 9 shows an example of code in the Python language which can be used in an embodiment of the present invention.

In code (901-906) below, the dictionaries are global variable dictionaries and built-in dictionaries. In code (901-906), speculative optimization is rendering the values of the global variables as constants. In other words, it is replacing global variables in the code with values extracted from dictionaries, and treating the values as constants. In code (901-906), speculative optimization is also static determination of callees for built-in functions. In other words, it is replacing the jump destinations that is, callees of built-in functions in the code (901-906) with values extracted from dictionaries, and treating the values as constants.

In an embodiment of the prior art as shown in FIG. 5 and FIG. 6, the compiled code for method foo( ) in code (901-906) cannot continue to be executed because the compiled code for method foo( ) in code (901-906) is to be invalidated. However, in an embodiment of the present invention as shown in FIG. 6 and FIG. 7a through FIG. 7c, the compiled code for method foo( ) in code (901-906) can continue to be executed because the compiled code for method foo( ) in code (901-906) is invalidated only under certain conditions. In other words, invalidation of the compiled code for method foo( ) is prohibited under certain conditions.

The following is an explanation of the processing that occurs when code (901-906) has been executed. Note that all of the processing is not described in this explanation. The numbers added to the left side of the code (901-906) has been added to facilitate the explanation. Numbers do not have to be displayed on the screen.

Code 901 is an example of optimized code that can be executed without invalidating code optimized by replacing the global variable in the code to be optimized with a value extracted from a global variable dictionary in the compiled code associated with the global variable dictionary when the speculative optimization is to recognize the value of a global variable extracted from a global variable dictionary, the first dictionary n as a constant, and the change related to the global variable dictionary is the addition of a key.

The key g is newly added by "g=1" in the 1st line, foo( ) is executed 100 times in the 11th line, a jump is made to method foo( ) in the 3rd line, and "g" is called up in the 4th line. When method foo( ) has been called up for the 100th time, method foo( ) is compiled, and compiled code is generated. Next, there is a jump to the 12th line, and a jump to method bar( ) in the 6th line. A key, which is the symbol "h", is added to the global variable dictionary, the first dictionary m, in the 8th line, and −1 is set as the value. Thus, in this example, because m=n and key "h" has been added to the global variable dictionary, the code is not invalidated, and the compiled code for method foo( ) in code (901) can continue to be executed according to Step 722 in FIG. 7b.

Code 902 is an example of optimized code that can be executed without invalidating code optimized by replacing the global variable in the code to be optimized with a value extracted from a global variable dictionary in the compiled code associated with a built-in function dictionary when the speculative optimization is to recognize the value of a global variable extracted from a global variable dictionary (the first dictionary, n) as a constant, and the change related to the built-in function dictionary is an update using a different value.

The key g is newly added by "g=1" in the 1st line, foo( ) is executed 100 times in the 10th line, a jump is made to method foo( ) in the 3rd line, and "g" is called up in the 4th line. When method foo( ) has been called up for the 100th time, method foo( ) is compiled, and compiled code is generated. Next, there is a jump to the 11th line, and a jump to method bar( ) in the 6th line. Next, "abs" serving as the key and "(x:0)", which is the jump destination serving as the value associated with this key, are updated in the built-in function dictionary, the second dictionary m, in the 7th line. Thus, in this example, because m>n and the value corresponding to the key in the built-in dictionary has simply been updated, the code is not invalidated and the compiled code for method foo( ) in code (902) can continue to be executed according to Step 706 in FIG. 7a.

Code 903 is an example of optimized code that can be executed without invalidating code optimized by replacing the global variable in the code to be optimized with a value extracted from a global variable dictionary in the compiled code associated with the global variable dictionary when the speculative optimization is to recognize the value of a global variable extracted from a global variable dictionary, the first dictionary n, as a constant, the change related to the global variable dictionary is an address change, and all of the pairs keys and values in the dictionary after the change completely match any pair of keys and values in the original dictionary.

In the 8th line, bar( ) is executed 100 times, the method exec in the 5th line is in the method bar( ) in the 2nd line, and a program passed to string "s" is executed. When method foo( ) has been called up for the 100th time, method foo( ) is compiled, and compiled code is generated. At this time, dictionary gdic after "in" in the 5th line is the global variable dictionary, the first dictionary m. As seen in the 3rd line, gdic has key "g", and 1 is extracted as the value associated with key g. Each time the 3rd line is executed, the address of dictionary gdic changes, and the address of the global dictionary passed to foo( ) executed in the 5th line is different each time. However, the key in the gdic entry is "g" and the value is 1. These do not change. Thus, the address of dictionary gdic changes, but all of the pairs of keys and values for dictionary gdic after the change match any pair of keys and values in the original dictionary gdic. Thus, in this example, m=n and the address of the dictionary is changed. However, all of the pairs of the keys and values of the dictionary after the change match any pair of keys and values of the original dictionary. Therefore, the code is not invalidated, and the compiled code for method foo( ) in the code (903) can continue to be executed (Step 726 in FIG. 7b).

Code 904 is an example of optimized code that can be executed without invalidating code optimized by replacing the callee of the built-in function with a value extracted from a dictionary in the compiled code associated with a global variable dictionary when the speculative optimization is a static decision for the callee of the built-in function extracted from a built-in function dictionary, the second dictionary n, and the change related to the global variable dictionary is an update using a different value.

The key g is newly added by "g=1" in the 1st line, foo(1) is executed 100 times in the 10th line, there is a jump to method foo( ) in the 3rd line, and built-in function abs( ) is called up in the 4th line. When method foo( ) has been called up for the 100th time, method foo( ) is compiled, and compiled code is generated. Next, in the 7th line, the value for the key, which is the symbol g, is changed to −1 in the global variable dictionary, the first dictionary m. Thus, in this example, because m<n and only the value for g is updated in the global variable dictionary, the code is not invalidated, and the compiled code for method foo( ) in code (904) can continue to be executed according to Step 732 in FIG. 7c.

Code 905 is an example of optimized code that can be executed without invalidating code optimized by replacing the callee of the built-in function with a value extracted from a dictionary in the compiled code associated with a built-in function dictionary when the speculative optimization is a static decision for the callee of the built-in function extracted from a built-in function dictionary, the second dictionary n, and the change related to the built-in function dictionary is the addition of a key.

In the 8th line, foo(1) is executed 100 times, there is a jump to method foo( ) in the 2nd line, and built-in method abs( ) is called up in the 3rd line. When method foo( ) has been called up 100 times, method foo( ) is compiled, and compiled code is generated. Next, there is a jump to the 9th line, and a jump to method bar( ) in the 5th line. Thus, in the 5th line, "abc" is added as the key, and "(x:0)", which is the jump destination serving as the value associated with the key, in the built-in function dictionary, the second dictionary m. Thus, in this example, because m=n and a key has only been added to the built-in function dictionary, the code is not invalidated, and the compiled code for method foo( ) in code (905) can continue to be executed according to Step 722 in FIG. 7b.

Code 906 is an example of optimized code that can be executed without invalidating code optimized by replacing the callee of a built-in function dictionary with a value extracted from a dictionary in the compiled code associated with the global variable dictionary when the speculative optimization is a static decision for the callee of the built-in function extracted from a built-in function dictionary, the second dictionary n, the change related to the global variable dictionary is an address change, and all of the keys in the dictionary after the change completely matches any key in the original dictionary.

In the 8th line, bar(1) is executed 100 times, the method exec in the 5th line is in the method bar( ) in the 2nd line, and a program passed to string "s" is executed. When method foo( ) has been called up for the 100th time, method foo( ) is compiled, and compiled code is generated. At this time, dictionary gdic after "in" in the 5th line is the global variable dictionary, the first dictionary m. The method int( ) in the 4th line is the built-in function, the second dictionary n. Because a new dictionary is created each time the 3rd line is executed, the address of dictionary gdic changes, and the address of the global variable dictionary passed to foo( ) executed in the 5th line is different each time. The address of the global variable dictionary passed to foo( ) executed in the 5th line is different each time. As seen in the 3rd line, gdic has g as a key, and x is the extracted value associated with key g. Because x is a variable, it can be different from before. However, the key in the 3rd line is g and always matches. Thus, in this example, m<n and the address of the dictionary is changed. However, all of the pairs of the keys and values of the dictionary after the change match any pair of key and value of the original dictionary. Therefore, the code is not invalidated, and the compiled code for method foo( ) in the code (906) can continue to be executed as shown in Step 736 in FIG. 7c.

Example

A test was conducted in a Python processing system to compare a case in which the present invention was applied to a case in which the present invention was not applied. When a case in which present invention was applied was compared to a case in which the present invention was not applied, the runtime was 34.2% faster. The measurement test environment was as follows.

The target program was obtained by porting the unladed swallow benchmark (see Non-patent Literature 7) django (generating a 150×150 cell html table) to a web framework called Tornado developed by FACEBOOK® as shown in "Tornado".

As for the runtime environment, the CPU was x86 Westmere-EP (Intel®) 2.93 GHz, and the operating system was Red Hat Enterprise Linux 6.0.

In one embodiment of the present invention, optimization was performed as follows when the code was code written in the Python language:

Compiling was performed treating infrequently updated global variables (see Non-patent Literature 1) as constants; and Jump address decisions were sped up when built-in functions were called up.

Also, as a result of this optimization, other types of optimization became applicable. Other types of optimization include constant propagation and code specialization. Code propagation is a technique in which the values in the equations are replaced by known constant values during compiling. In addition to the constant folding described above, these constants include intrinsic functions which set constant values as arguments which are functions that are not called up by the compiler, but are replaced by machine code. Code specialization is combined with dynamically or statically obtained type information to enable replacement using simpler instructions.

In the present invention, variables belonging to a plurality of dictionaries are monitored because certain variables are based on information indicating whether or not a storage area used to manage a dictionary has been updated. Also, even when a storage area is updated using information during compiling in the order n in which values were extracted, the present invention can determine whether only the code optimized by optimization using replacement with extracted values should be invalidated in the compiled code associated with a dictionary with a detected change related to dictionaries under certain conditions.

The invention claimed is:

1. A method for speculatively optimizing code, the method comprising the steps of:
   searching in a predetermined order a set of a plurality of dictionaries including an at least one dictionary holding at least one set of keys and values associated with the keys;
   extracting a value associated with a symbol name from at least one dictionary using the symbol name as a key;
   performing optimization to replace a symbol in the code with the extracted value, and compiling code to be compiled including some or all of the optimized code;
   comparing, in response to detection of a change related to one dictionary among the set containing at least one dictionary, an order m in the predetermined order of the dictionary having the detected change to an order n in the predetermined order of a dictionary having the extracted value, wherein m is an integer equal to or greater than 1 and n is an integer equal to or greater than 1;

invalidating the code optimized in the optimization using extracted value replacement in the compiled code associated with the dictionary having the detected change in response to the comparison of the order m and the order n and the detected change; and wherein at least one of the steps is carried out using a computer device.

2. The method according to claim 1, wherein the change related to the dictionary comprises the steps of:
adding a key;
deleting a key; and
updating using the same value or a different value, or a change in dictionary address.

3. The method according to claim 2, wherein the invalidating step performs invalidation under conditions in which the order m is less than the order n, the change related to the dictionary is addition of a key, deletion of a key, or a dictionary address change, and one key in a dictionary after an address change does not match any key in the dictionary before the address change; or the order m is equal to the order n, the change related to the dictionary is deletion of a key, an update uses a different value or a dictionary address change, and one of pair of keys and values in a dictionary after an address change does not match any pair of keys or values in the dictionary before the address change.

4. The method according to claim 3, wherein the computer further comprises the step of executing a step for recording the order n.

5. The method according to claim 3, wherein the invalidating step prohibits invalidation under conditions in which the order m is less than the order n, the change related to the dictionary is an update using the same value or a different value, or a dictionary address change, and all of the keys of a dictionary after an address change match any key of the dictionary before the address change; and the order m is equal to the order n, the change related to the dictionary is addition of a key, an update using the same key, or a dictionary address change, and all of the pairs of keys and values of a dictionary after an address change match any pair of keys or values in the dictionary before the address change; or the order m is greater than the order n regardless of the detected change related to the dictionary.

6. The method according to claim 4, wherein the step for recording the order n further comprises the step of:
storing, as data associated with the compiled code, the order n, sets of keys and values of dictionaries with up to n the order, and the addresses of dictionaries with up to the order n.

7. The method according to claim 6, wherein the comparing step further comprises the steps of:
identifying the compiled code associated with the dictionary with the detected change; and
extracting the order n from the data associated with the compiled code.

8. The method according to claim 6, wherein the invalidating step further comprises the step of:
extracting a key, value, dictionary address or a combination thereof from the data associated with the identified compiled code.

9. The method according to claim 1, wherein the comparing step and the invalidating step are executed during execution of the compiled code after the compiling step or during execution of uncompiled code in the compiling step.

10. The method according to claim 1, wherein optimization to replace the symbol in the code with the extracted value is performed on a symbol in the code determined by a value referenced in at least one of the dictionaries.

11. The method according to claim 1, wherein the computer further comprises the step of associating the compiled code with the dictionary from which the value used in the optimization of the compiled code during compiling was extracted.

12. The method according to claim 1, wherein the computer further comprises the step of:
initiating the monitoring of dictionaries referenced during the search among at least one dictionary, that is, changes related to up to a n-th dictionary or changes related to all of the dictionaries.

13. The method according to claim 1, wherein the computer further comprises the step of:
repeating the comparing step and the invalidating step each time a change related to at least one dictionary has been detected after the invalidating step.

14. The method according to claim 1, wherein the plurality of dictionaries is comprised of:
a global variable or function dictionary having a $1^{st}$ order and a built-in variable or function dictionary having a $2^{nd}$ order in the predetermined order, and the $1^{st}$ order is given priority over the $2^{nd}$ order in the predetermined order.

15. The method according to claim 14, wherein the code is written in the Python language.

16. A computer for speculatively optimizing code, the computer comprising:
a value extracting unit searching in a predetermined order at least one dictionary holding one or more sets of keys and values associated with the keys, and extracting a value associated with a symbol name from the one or more dictionaries using the symbol name as a key;
a compiling unit performing optimization to replace a symbol in the code with the extracted value, and compiling code to be compiled including some or all of the optimized code;
a comparing unit producing a result by comparing, in response to detection of a change related to one dictionary among the one or more dictionaries, an order m, where m is an integer equal to or greater than 1, in the predetermined order of the dictionary with the detected change to an order n, where n is an integer equal to or greater than 1, in the predetermined order of a dictionary having the extracted value; and
an invalidating unit invalidating the code optimized in the optimization using extracted value replacement in the compiled code associated with the dictionary having the detected change in response to the results from the orders comparison and the detected change,
wherein the change related to the dictionary is addition of a key, deletion of a key, an update using the same value or a different value, or a change in dictionary address, and further, wherein the invalidating unit performs invalidation under conditions in which:
the order m is less than the order n, the change related to the dictionary is addition of a key, deletion of a key, or a dictionary address change, and a key in a dictionary after an address change does not match any key in the dictionary before the address change; or
the order m is equal to the order n, the change related to the dictionary is deletion of a key, an update using a different value, or a dictionary address change, and a pair of the key and value in a dictionary after an address change do not match any pair of key or the value of the dictionary before the address change.

17. The computer according to claim 16, wherein the invalidating unit prohibits invalidation under conditions in which:

the order m is less than the order n, the change related to the dictionary is an update using the same value or a different value, or a dictionary address change, and all of the keys of a dictionary after an address change match any key of the dictionary before the address change;

the order m is equal to the order n, the change related to the dictionary is addition of a key, an update using the same value, or a dictionary address change, and all of the pairs of the keys and values in a dictionary after an address change matches any pair of key or the value of the dictionary before the address change; or the order m is greater than the order n regardless of the detected change related to the dictionary.

18. A computer readable storage medium tangibly embodying a computer readable program code having computer readable instructions which, when implemented, cause a computer to carry out the steps of a method for optimizing code comprising:

searching in a predetermined order at least one dictionary holding at least one set of keys and values associated with the keys;

extracting a value associated with a symbol name from at least one dictionary using the symbol name as a key;

performing optimization to replace a symbol in the code with the extracted value, and compiling code to be compiled including some or all of the optimized code;

comparing, in response to detection of a change related to one dictionary among a set containing at least one dictionary, an order m in the predetermined order of the dictionary having the detected change to an order n in the predetermined order of a dictionary having the extracted value, wherein m is an integer equal to or greater than 1 and n is an integer equal to or greater than 1; and invalidating the code optimized in the optimization using extracted value replacement in the compiled code associated with the dictionary having the detected change in response to the comparison and the detected change.

19. The computer readable storage medium according to claim 18, wherein the change related to the dictionary comprises the steps of:

adding a key;

deleting a key; and updating using the same value or a different value, or a change in dictionary address, and the invalidating step performs invalidation under conditions in which the order m is less than the order n, the change related to the dictionary is addition of a key, deletion of a key, or a dictionary address change, and one key in a dictionary after an address change does not match any key in the dictionary before the address change; or the order m is equal to the order n, the change related to the dictionary is deletion of a key, an update uses a different value or a dictionary address change, and one of pair of keys and values in a dictionary after an address change does not match any pair of keys or values in the dictionary before the address change.

20. The computer readable storage medium according to claim 19, wherein the invalidating step prohibits invalidation under conditions in which the order m is less than the order n, the change related to the dictionary is an update using the same value or a different value, or a dictionary address change, and all of the keys of a dictionary after an address change match any key of the dictionary before the address change; and the order m is equal to the order n, the change related to the dictionary is addition of a key, an update using the same key, or a dictionary address change, and all of the pairs of keys and values of a dictionary after an address change match any pair of keys or values in the dictionary before the address change; or the order m is greater than the order n regardless of the detected change related to the dictionary.

* * * * *